(12) United States Patent
Ishigaki et al.

(10) Patent No.: US 9,973,071 B2
(45) Date of Patent: May 15, 2018

(54) CONTROL DEVICE AND CONTROL METHOD FOR POWER CONVERTER

(71) Applicants: Masanori Ishigaki, Nagoya (JP); Shuji Tomura, Nagoya (JP); Takaji Umeno, Nisshin (JP); Masaki Okamura, Toyota (JP); Daigo Nobe, Susono (JP)

(72) Inventors: Masanori Ishigaki, Nagoya (JP); Shuji Tomura, Nagoya (JP); Takaji Umeno, Nisshin (JP); Masaki Okamura, Toyota (JP); Daigo Nobe, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1057 days.

(21) Appl. No.: 14/354,065

(22) PCT Filed: Oct. 2, 2012

(86) PCT No.: PCT/JP2012/075500
§ 371 (c)(1),
(2) Date: Apr. 24, 2014

(87) PCT Pub. No.: WO2013/061731
PCT Pub. Date: May 2, 2013

(65) Prior Publication Data
US 2014/0265605 A1  Sep. 18, 2014

(30) Foreign Application Priority Data
Oct. 24, 2011 (JP) .................................. 2011-232770

(51) Int. Cl.
*H02M 1/08* (2006.01)
*H02M 3/158* (2006.01)
*B60L 11/18* (2006.01)
(Continued)

(52) U.S. Cl.
CPC ........... *H02M 1/08* (2013.01); *B60L 11/1855* (2013.01); *B60L 11/1861* (2013.01);
(Continued)

(58) Field of Classification Search
CPC . H02M 2001/0067; H02M 2001/0083; H02M 3/158; H02M 7/44; H02M 7/537; H02M 7/66; H02M 7/797; B60L 1210/10; B60L 1210/14; B60Y 2400/112; B60Y 2400/114
See application file for complete search history.

(56) References Cited

U.S. PATENT DOCUMENTS 9,431,824 B2 *  8/2016  Ishigaki ................ H02M 3/158
9,647,544 B2 *  5/2017  Ishigaki ................ H02M 3/158
(Continued)

FOREIGN PATENT DOCUMENTS

JP  2002-125363  4/2002
JP  2006-222593  8/2006
(Continued)

*Primary Examiner* — Daniel Kessie
(74) *Attorney, Agent, or Firm* — Finnegan, Henderson, Farabow, Garrett & Dunner, LLP

(57) ABSTRACT

The power converter includes a first operation mode in which each of switching elements is controlled on or off independently so as to perform a power conversion between a load and both a first DC power source and a second DC power source and a second operation mode in which every two of the switching elements are controlled on or off concurrently so as to perform the power conversion between the load and the first DC power source or the second DC power source. A switching speed at which when each of the switching elements is turned on or turned off is controlled in accordance with the operation mode. Specifically, the switching speed in the second operation mode is higher than the switching speed in the first operation mode.

10 Claims, 18 Drawing Sheets

(51) Int. Cl.
*H02M 3/155* (2006.01)
*H02M 1/088* (2006.01)
*H02J 7/00* (2006.01)
*H02M 1/00* (2006.01)
*H02J 1/10* (2006.01)

(52) U.S. Cl.
CPC ........... *H02J 7/0024* (2013.01); *H02M 1/088* (2013.01); *H02M 3/155* (2013.01); *H02M 3/158* (2013.01); *B60L 2220/14* (2013.01); *B60L 2240/545* (2013.01); *B60L 2240/547* (2013.01); *B60L 2240/549* (2013.01); *H02J 1/102* (2013.01); *H02M 2001/0003* (2013.01); *H02M 2001/0029* (2013.01); *Y02T 10/7005* (2013.01); *Y02T 10/705* (2013.01); *Y02T 10/7044* (2013.01); *Y02T 10/7055* (2013.01); *Y10T 307/696* (2015.04)

(56) References Cited

U.S. PATENT DOCUMENTS

| | | | |
|---|---|---|---|
| 2005/0146295 A1 | 7/2005 | Miyamoto et al. | |
| 2008/0238383 A1* | 10/2008 | Watanabe | H02M 1/32 323/271 |
| 2009/0033377 A1* | 2/2009 | Hashimoto | H02M 3/07 327/112 |
| 2009/0290269 A1* | 11/2009 | Watanabe | H02M 3/158 361/18 |
| 2010/0038962 A1 | 2/2010 | Komatsu | |
| 2010/0050676 A1* | 3/2010 | Takamatsu | B60K 11/02 62/259.2 |
| 2010/0244798 A1* | 9/2010 | Nakatomi | H02M 3/156 323/282 |
| 2010/0283514 A1* | 11/2010 | Soeno | H01L 29/0834 327/109 |
| 2012/0126764 A1* | 5/2012 | Urakabe | H02M 3/158 323/282 |
| 2013/0134786 A1 | 5/2013 | Ishigaki et al. | |
| 2014/0376287 A1* | 12/2014 | Narimani | H02M 3/07 363/60 |

FOREIGN PATENT DOCUMENTS

| | | |
|---|---|---|
| JP | 2008-54477 | 3/2008 |
| JP | 2008131830 A * | 6/2008 |
| JP | 2008-167620 | 7/2008 |
| JP | 2010-57288 | 3/2010 |
| WO | WO 2006/104449 | 10/2006 |

* cited by examiner

| OPERATION MODE | POWER SOURCE |
|---|---|
| PARALLEL CONNECTION MODE | DC POWER SOURCES 10 AND 20 |
| SERIES CONNECTION MODE | DC POWER SOURCES 10 AND 20 |
| SINGLE POWER SOURCE MODE | DC POWER SOURCE 10 ONLY |
| | DC POWER SOURCE 20 ONLY |

(a)

(b)

(a)

(b)

(a)

(b)

(a)

(b)

(a)

(b)

(a)

(b)

|  | PARALLEL CONNECTION I | PARALLEL CONNECTION II |
|---|---|---|
| SG1 | /SDa or /SDb | /SDa or /SDb |
| SG2 | /SDa or SDb | /SDa or SDb |
| SG3 | SDa or SDb | SDa or SDb |
| SG4 | SDa or /SDb | SDa or /SDb |
| Dv | Db | Da |
| Di | Da | Db |
| Hv | TRANSFER FUNCTION OF FIG. 8 | TRANSFER FUNCTION OF FIG. 7 |
| Hi | TRANSFER FUNCTION OF FIG. 7 | TRANSFER FUNCTION OF FIG. 8 |
| DvFF | (Vo−V[2])/Vo | (Vo−V[1])/Vo |
| DiFF | (Vo−V[1])/Vo | (Vo−V[2])/Vo |
| Ii | I[1] | I[2] |

| | SERIES CONNECTION |
|---|---|
| SG1 | /SDc |
| SG2 | SDc |
| SG3 | FIXED AT H |
| SG4 | SDc |
| Dv | Dc |
| Hv | TRANSFER FUNCTION OF FIG. 10 |
| DvFF | $\dfrac{\{Vo-(V[2]+V[1])\}}{Vo}$ |

(a) HIGH GATE RESISTANCE    (b) LOW GATE RESISTANCE

CONTROL DEVICE AND CONTROL METHOD FOR POWER CONVERTER

CROSS-REFERENCE TO RELATED APPLICATIONS

This application is a national phase application of International Application No. PCT/JP2012/075500, filed Oct. 2, 2012, which claims the priority of Japanese Patent Application No. JP 2011-232770, filed Oct. 24, 2011, the content of both of which is incorporated herein by reference.

TECHNICAL FIELD

The present invention relates to a control device and a control method for a power converter, and more specifically relates to a control of a switching speed of semiconductor power switching elements constituting a power converter.

BACKGROUND ART

Generally, a power converter is used to perform a power conversion between a DC power and a load in accordance with an on or off control of a plurality of semiconductor power switching elements (hereinafter, simply referred to as "switching elements"). It is known that such power converter has multiple operation modes.

Japanese Patent Laying-Open No. 2008-54477 (PTD 1) describes a voltage converting device having a plurality of DC voltages as inputs and outputting a plurality of DC voltages. In the voltage converting device described in PTD 1, operation modes are changed by switching the connection between a terminal of an energy storage device (coil) and a plurality of input potentials as well as a plurality of output potentials. The operation modes include a mode in which two DC power sources are connected in parallel for supplying electric power to the load.

Japanese Patent Laying-Open No. 2010-57288 (PTD 2) describes a structure of a power source device which includes a first power storage unit and a second power storage unit, and is provided with a switch for switching a series connection and a parallel connection between the power storage units. Specifically, the power source device of PTD 2 has an operation mode in which the first power storage unit and the second power storage unit are connected in series and an operation mode in which both are connected in parallel.

Japanese Patent Laying-Open No. 2002-125363 (PTD 3) and Japanese Patent Laying-Open No. 2006-222593 (PTD 4), for example, describe a structure configured to change a gate resistance so as to variably control a change rate of a voltage or a current (typically, a gate voltage), namely a switching speed of a control electrode when it is turned on or turned off as a drive circuit of switching elements which constitute a power converter.

CITATION LIST

Patent Document

PTD 1: Japanese Patent Laying-Open No. 2008-54477
PTD 2: Japanese Patent Laying-Open No. 2010-57288
PTD 3: Japanese Patent Laying-Open No. 2002-125363
PTD 4: Japanese Patent Laying-Open No. 2006-222593

SUMMARY OF INVENTION

Technical Problem

A power converter having a plurality of operation modes is anticipated to change the control of switching elements in response to an operation mode. In particular, it is concerned that the efficiency of the power converter will decrease due to the power loss occurring simultaneously on a plurality of switching elements in a case where an on or off control is performed concurrently on a part of a plurality of switching elements in some operation modes.

The present invention has been accomplished in view of the aforementioned problems, and therefore an object of the present invention is expected to suppress a surge voltage and reduce a switching loss according to the changing of operation modes in a power converter which is configured to include a plurality of switching elements.

Solution to Problem

According to an aspect of the present invention, a control device for a power converter equipped with a plurality of switching elements includes a drive control circuit disposed in correspondence with each of the plurality of switching elements and a control circuit. The drive control circuit controls a driving speed of a control electrode of a corresponding switching element. The control circuit is configured to select a first mode in which each of the plurality of switching elements is controlled on or off independently and a second mode in which at least two switching elements among the plurality of switching elements are controlled on or off concurrently. The drive control circuit sets the driving speed higher in the second mode than in the first mode.

Preferably, the power converter is configured to perform a DC voltage conversion between a power line electrically connected to a load and a first DC power source and a second DC power source so as to control an output voltage on the power line. The plurality of switching elements includes a first switching element, a second switching element, a third switching element and a fourth switching element. The first switching element is electrically connected between the power line and a first node. The second switching element is electrically connected between the first node and a second node. The third switching element is electrically connected between the second node and a third node electrically connected to a negative terminal of the second DC power source. The fourth switching element is electrically connected between the third node and a negative terminal of the first DC power source. The power converter further includes a first reactor which is electrically connected between the second node and a positive terminal of the first DC power source, and a second reactor which is electrically connected between the first node and a positive terminal of the second DC power source.

More preferably, the power converter operates in the first mode, in accordance with the control of the first to fourth switching elements, to perform the DC voltage conversion in such a state that the first power source and the second power source are electrically connected in parallel to the power line.

More preferably, the power converter, in accordance with the on or off control performed concurrently on the first and second switching elements and the on or off control performed concurrently on the third and fourth switching elements in the second mode, performs the DC voltage conversion between the first power source and the power line.

More preferably, the power converter, in accordance with the on or off control performed concurrently on the first and fourth switching elements and the on or off performed concurrently control of the second and third switching elements in the second mode, performs the DC voltage conversion between the second power source and the power line.

Preferably, the control device, in changing the first mode to the second mode, increases the driving speed in the drive control circuit after changing the control of the plurality of switching elements.

Preferably, the control device, when changing the second mode to the first mode, changes the control of the plurality of switching elements after decreasing the driving speed in the drive control circuit.

According to another aspect of the present invention, a control method for a power converter equipped with a plurality of switching elements is provided. The power converter is provided with a first mode in which each of the plurality of switching elements is controlled on or off independently and a second mode in which at least two switching elements among the plurality of switching elements are controlled on or off concurrently. The control method includes a step of controlling a driving speed of a control electrode of the switching element at a first speed through a drive control circuit disposed in correspondence with each of the plurality of switching elements as the power converter is operating at the first mode, and a step of controlling the driving speed at a second speed which is higher than the first speed through the drive control circuit as the power converter is operating at the second mode.

Preferably, the control method further includes a step of issuing an instruction of changing the first mode to the second mode, a step of changing the control of the plurality of switching elements as the instruction of changing the first mode to the second mode is issued, and a step of increasing the driving speed from the first speed to the second speed through the drive control circuit after changing the control of the plurality of switching elements.

Preferably, the control method further includes a step of issuing an instruction of changing the second mode to the first mode, a step of decreasing the driving speed from the second speed to the first speed through the drive control circuit as the instruction of changing the second mode to the first mode is issued, and a step of changing the control of the plurality of switching elements after decreasing the driving speed.

Advantageous Effects of Invention

According to the present invention, it is possible to suppress a surge voltage and reduce a switching loss by controlling the switching speed in accordance with the operation modes in a power converter which is configured to include a plurality of switching elements.

DESCRIPTION OF EMBODIMENTS

Figure 1:
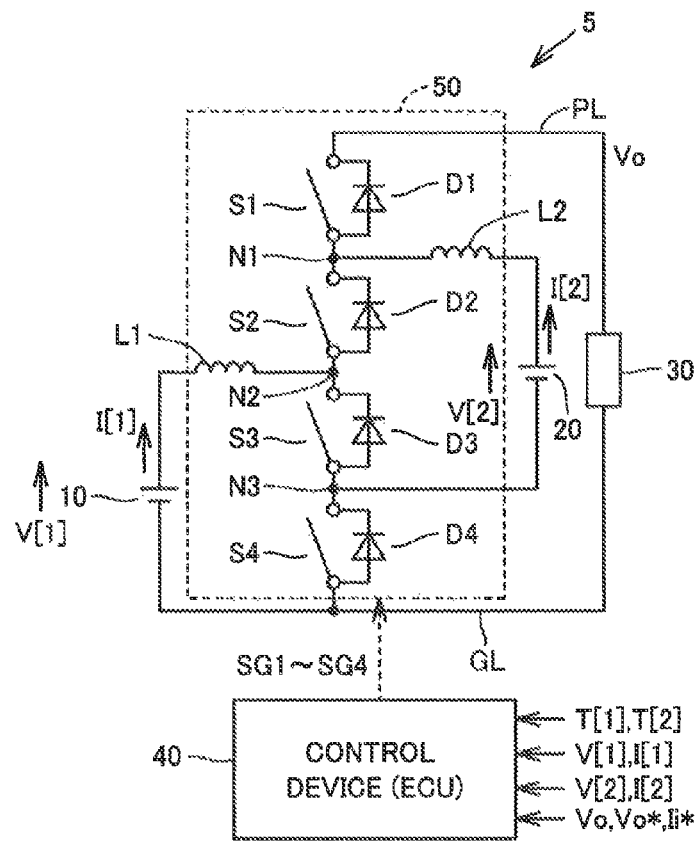
FIG. 1 is a circuit diagram illustrating an exemplary configuration of a power supply system including a control device for a power converter according to an embodiment of the present invention.

Hereinafter, an embodiment of the present invention will be described in detail with reference to the drawings. It should be noted that in the following description, the same or equivalent parts in the drawings will be given the same reference marks and basically the description thereof will not be repeated.

(Circuit Configuration of Power Converter)

FIG. 1 is a circuit diagram illustrating an exemplary configuration of a power supply system including a control device for a power converter according to an embodiment of the present invention.

With reference to FIG. 1, a power supply system 5 includes a DC power source 10, a DC power source 20, a load 30, and a power converter 50.

In the present embodiment, each of DC power sources 10 and 20 is formed from a DC voltage source element superior in output characteristics, such as a secondary battery like a lithium ion secondary battery or a nickel hydride battery, an electric double layer capacitor or a lithium ion capacitor. DC power source 10 and DC power source 20 correspond to a "first DC power source" and a "second DC power source", respectively.

DC power sources 10 and 20 may be formed from the DC power sources with the same type and the same capacity or from the DC power sources different in characteristics and/or capacities.

Power converter 50 is connected between DC power sources 10 and 20 and load 30. Power converter 50 is configured to control a DC voltage on a power line PL which is connected to load 30 (hereinafter, referred to as output voltage Vo as well) in accordance with a voltage command value Vo*.

Load 30 operates after receiving output voltage Vo from power converter 50. Voltage command value Vo* is set to a value appropriate for the operation of load 30. Voltage command value Vo* may be set variably in accordance with the state of load 30. In addition, load 30 may be configured to generate a charging power for charging DC power sources 10 and 20 through power regeneration or the like.

Power converter 50 includes switching elements S1 to S4, and reactors L1 and L2. In the present embodiment, an IGBT (Insulated Gate Bipolar Transistor), a power MOS (Metal Oxide Semiconductor) transistor, a power bipolar transistor or the like may be used as the switching element. Anti-parallel diodes D1 to D4 are disposed relative to switching elements S1 to S4, respectively. Further, switching elements S1 to S4 may be controlled on or off in response to a control signal (not shown).

Switching element S1 is electrically connected between power line PL and a node N1. Reactor L2 is connected between node N1 and a positive terminal of DC power source 20. Switching element S2 is electrically connected between node N1 and a node N2. Reactor L1 is connected between node N2 and a positive terminal of DC power source 10.

Switching element S3 is electrically connected between node N2 and a node N3. Node N3 is electrically connected to a negative terminal of DC power source 20. Switching element S4 is electrically connected between node N3 and a ground line GL. Ground line GL is electrically connected to load 30 and the negative terminal of DC power source 10.

As can be seen from FIG. 1, power converter 50 is configured to include a step-up chopper circuit for each of DC power source 10 and DC power source 20. Specifically, for DC power source 10, a first step-up chopper circuit where the current flows in two directions is formed to have switching elements S1 and S2 functioning as upper arm elements and switching elements S3 and S4 functioning as lower arm elements. Similarly, for DC power source 20, a second step-up chopper circuit where the current flows in two directions is formed to have switching elements S1 and S4 functioning as upper arm elements and switching elements S2 and S3 functioning as lower arm elements.

Thereby, switching elements S1 to S4 are included in both a power conversion path formed between DC power source 10 and power line PL by the first step-up chopper circuit and a power conversion path formed between DC power source 20 and power line PL by the second step-up chopper circuit.

In order to control output voltage Vo to load 30, a control device 40 is configured to generate control signals SG1 to SG4 for controlling respectively the on or off of switching elements S1 to S4. Although not shown in FIG. 1, detectors (voltage sensor and current sensor) are disposed to detect a voltage (hereinafter denoted by V[1]) and a current (hereinafter denoted by I[1]) for DC power source 10, a voltage (hereinafter denoted by V[2]) and a current (hereinafter denoted by I[2]) for DC power source 20, and output voltage Vo, respectively. Furthermore, it is preferable that detectors (temperature sensors) are disposed to detect temperatures (hereinafter denoted by T[1] and T[2]) for DC power sources 10 and 20, respectively. The outputs from these detectors are provided to control device 40.

Figure 2:
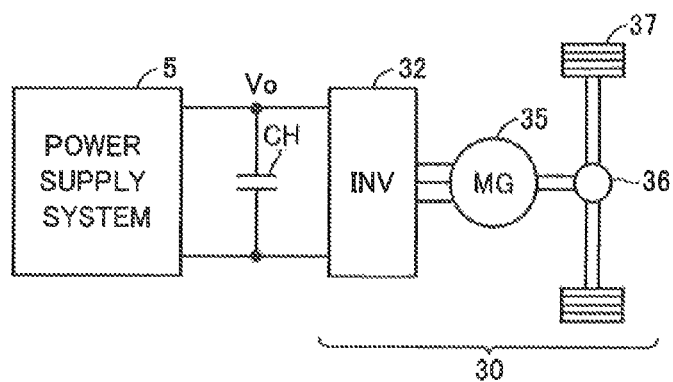
FIG. 2 is a schematic diagram illustrating an exemplary configuration of a load illustrated in FIG. 1.

FIG. 2 is a schematic diagram illustrating an exemplary configuration of load 30.

With reference to FIG. 2, load 30 is configured, for example, to include a driving motor for driving an electrically powered vehicle. Load 30 includes a smoothing capacitor CH, an inverter 32, a motor generator 35, a power transmission gear 36, and drive wheels 37.

Motor generator 35 is a driving motor for generating a vehicular driving force, and is formed from, for example, a permanent magnet synchronous motor of a plurality of phases. An output torque of motor generator 35 is transmitted to drive wheels 37 through the intermediary of power transmission gear 36 constituted by a reduction gear and a power split device. The electrically powered vehicle is driven to travel by the torque transmitted to drive wheels 37. Further, during the regenerative braking of the electrically powered vehicle, motor generator 35 generates electric power from the rotational force of driving wheels 37. The power generated is subjected to an AC/DC conversion by inverter 32. The converted DC power may be used as the charging power for DC power sources 10 and 20 included in power supply system 5.

In a hybrid vehicle mounted with an engine (not shown) in addition to the motor generator, the vehicular driving force required for the electrically powered vehicle is generated through the cooperative operation of the engine and motor generator 35. In this case, DC power sources 10 and 20 may be charged by using the power generated by the rotation of the engine.

Thus, the electrically powered vehicle may be any vehicle equipped with a driving motor, including both a hybrid vehicle which generates the vehicular driving force using the engine and the electric motor or a fuel cell vehicle equipped with no engine.

(Description of Operation Modes)

Hereinafter, the operation modes of power converter 50 will be described.

Figures 3, 4:
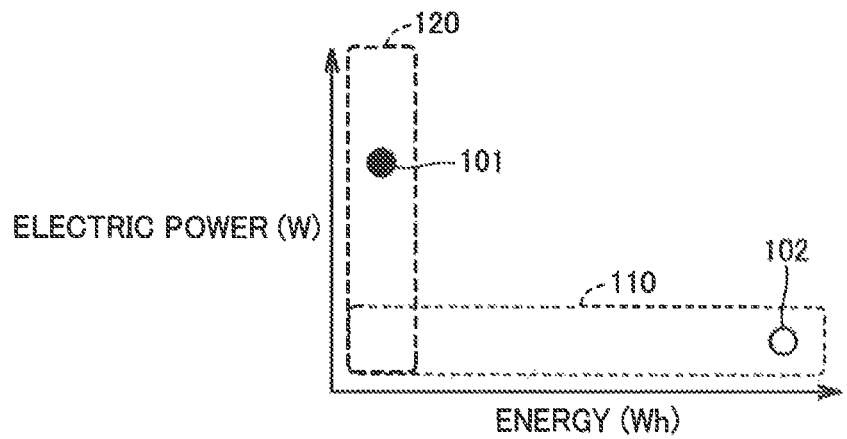
FIG. 3 is a table illustrating operation modes of the power converter illustrated in FIG. 1.
FIG. 4 is a conceptual diagram illustrating an example of characteristics of a DC power source.

With reference to FIG. 3, power converter 50 is provided with an operation mode in which both DC power source 10 and DC power source 20 are used, and an operation mode (hereinafter referred to as "single power source mode") in which only one of DC power sources 10 and 20 is used.

The operation mode in which two power sources are used includes an operation mode (hereinafter referred to as "parallel connection mode") in which the DC/DC power conversion is performed for DC power source 10 and DC power source 20 which are connected in parallel with load 30 and an operation mode (hereinafter referred to as "series connection mode") in which the DC/DC power conversion is performed for DC power source 10 and DC power source 20 which are connected in series to load 30. In particular, power converter 50 may operate to change between the parallel connection mode and the series connection mode through controlling switching elements S1 to S4.

Single power source mode includes a mode in which only DC power source 10 is used and a mode in which only DC power source 20 is used.

FIG. 4 is a conceptual diagram illustrating an example of characteristics of DC power sources 10 and 20. FIG. 4 illustrates a so-called Ragone plot in which the energy is plotted along the horizontal axis and the electric power is plotted along the vertical axis. Generally, since there is a trade-off relationship between an output power from a DC power source and an energy storage therein, it is difficult to obtain a high output from a high-capacity battery or to increase the energy storage in a high-output battery.

Therefore, it is preferable that one of DC power sources 10 and 20 is formed from a so-called high-capacity power source which has a high energy storage and the other is formed from a so-called high-output power source which has a high output. As such, the energy stored in the high-capacity power source is used as a long term constant supply, while the high-output power source is used as a buffer supply for compensating a shortage in the output from the high-capacity power source.

In the example of FIG. 4, DC power source 10 is formed from a high-capacity power source, and DC power source 20 is formed from a high-output power source. Therefore, an operating region 110 of DC power source 10 is narrower in the range of available output power than an operating region 120 of DC power source 20. On the other hand, operating region 120 is narrower in the range of available energy storage than operating region 110.

At an operating point 101 of load 30, a high power is required for a short time. For example, in an electrically powered vehicle, operating point 101 corresponds to the rapid acceleration performed by the user through accelerator operation. In contrast, at an operating point 102 of load 30, a relatively low power is required for a long time. For example, in an electrically powered vehicle, operating point 102 corresponds to the high-speed steady traveling.

The output from DC power source 20 having high output is mainly used to cope with operating point 101. On the other hand, the output from DC power source 10 having high capacity is mainly used to cope with operating point 102. Thus, in an electrically powered vehicle, by using the energy stored in a high-capacity battery over a long time, it is possible to extend the travelling distance covered by the electric energy and meanwhile rapidly offer the acceleration performance in correspondence with the accelerator operation by the user.

In addition, in the case where the DC power source is formed from a battery, the output characteristics may be degraded at a low temperature, and at a high temperature the charge and discharge characteristics may be restricted in order to suppress the progress of deterioration. Particularly, it is possible that in an electrically powered vehicle, a temperature difference may occur between DC power source 10 and DC power source 20 due to their different mounting positions. Therefore, it is possible that in power supply system 5, it may be efficient to use only one of the DC power sources depending on the state (especially the temperature) of DC power sources 10 and 20 or the request from load 30 as described above. Such possibilities may be coped with through the provision of the single power source mode.

In other words, in power supply system 5 according to the present embodiment, as illustrated in FIG. 3, an operation mode is selected among the parallel connection mode, the series connection mode and the single power source mode (DC power source 10 or 20), depending on the state of DC power sources 10 and 20 and/or load 30.

The operation of power converter 50 in each operation mode will be described. Firstly, the circuit operation of power converter 50 in the parallel connection mode will be described.

(Circuit Operation and Control in Parallel Connection Mode)

Figure 5:
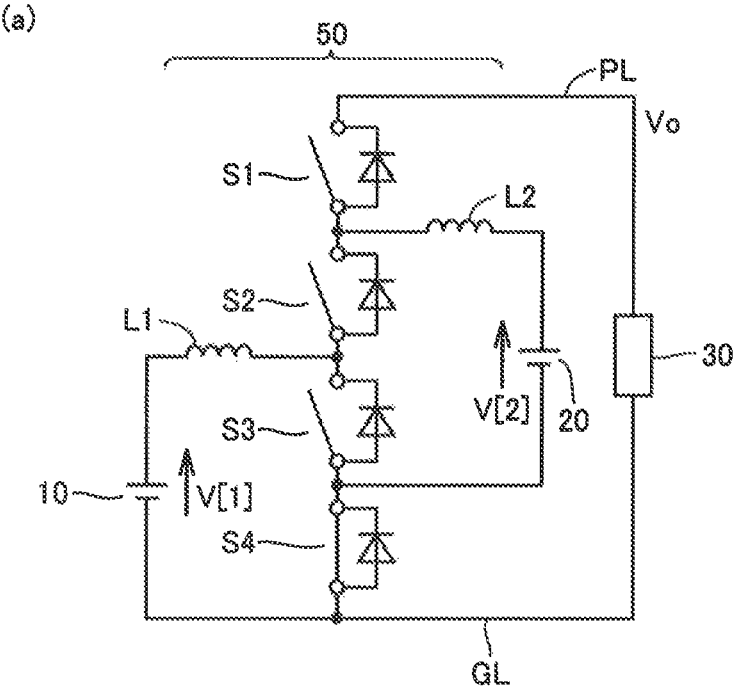
FIG. 5 includes circuit diagrams illustrating a first circuit operation in a parallel connection mode.
Figure 5:
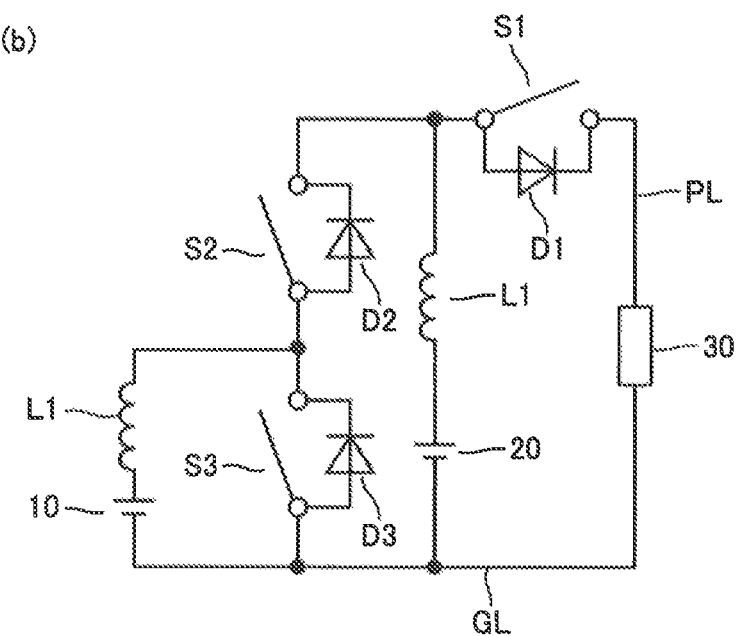
Figure 6:
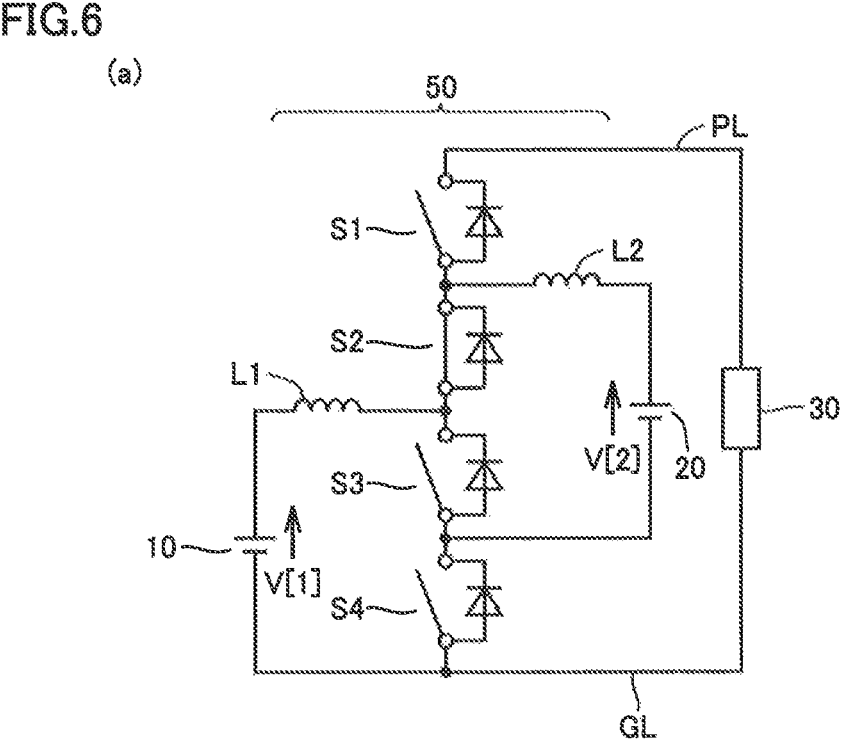
FIG. 6 includes circuit diagrams illustrating a second circuit operation in the parallel connection mode.
Figure 6:
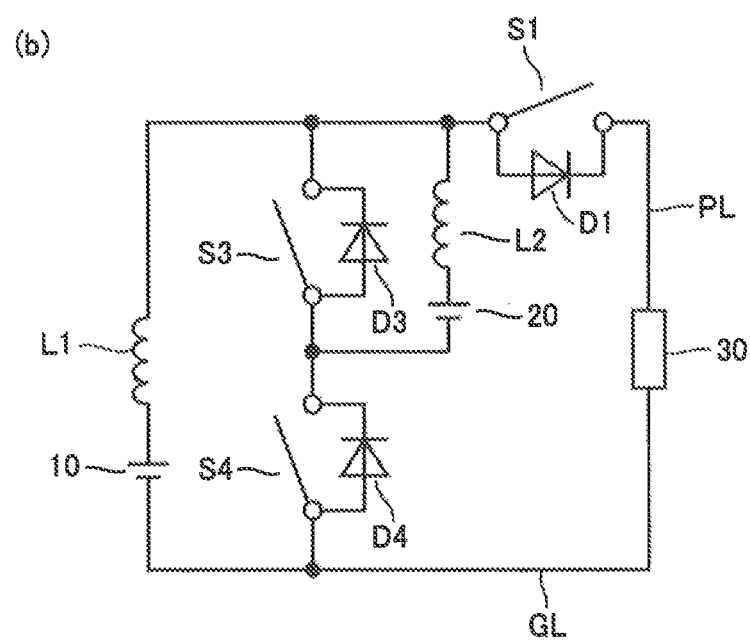

As illustrated in FIGS. 5 and 6, when switching element S2 or S4 is turned on, DC power sources 10 and 20 can be connected in parallel with power line PL. Here, in the parallel connection mode, the equivalent circuit will differ depending on which is higher between voltage V[1] of DC power source 10 and voltage V[2] of DC power source 20.

As illustrated in FIG. 5(a), when V[2]>V[1], turning on switching element S4 allows DC power sources 10 and 20 to be connected in parallel through switching elements S2 and S3. The equivalent circuit at this time is illustrated in FIG. 5(b).

With reference to FIG. 5(b), according to the on or off control performed on switching element S3, it is possible to form an on period and an off period alternately for the lower arm elements between DC power source 10 and power line PL. Similarly, according to the on or off control performed concurrently on switching elements S2 and S3, it is possible to form an on period and an off period alternately for the lower arm elements of the step-up chopper circuit between DC power source 20 and power line PL. Herein, switching element S1 operates as a switch for controlling regeneration from load 30.

On the other hand, as illustrated in FIG. 6(a), when V[1]>V[2], turning on switching element S2 allows DC power sources 10 and 20 to be connected in parallel through switching elements S3 and S4. The equivalent circuit at this time is illustrated in FIG. 6(b).

With reference to FIG. 6(b), according to the on or off control performed on switching element S3, it is possible to form an on period and an off period alternately for the lower arm elements between DC power source 20 and power line PL. Similarly, according to the on or off control performed concurrently on switching elements S3 and S4, it is possible to form an on period and an off period alternately for the lower arm elements of the step-up chopper circuit between DC power source 10 and power line PL. Herein, switching element S1 operates as a switch for controlling regeneration by load 30.

Hereinafter, the step-up operation of power converter 50 in the parallel connection mode will be described in detail with reference to FIGS. 7 and 8.

Figure 7:
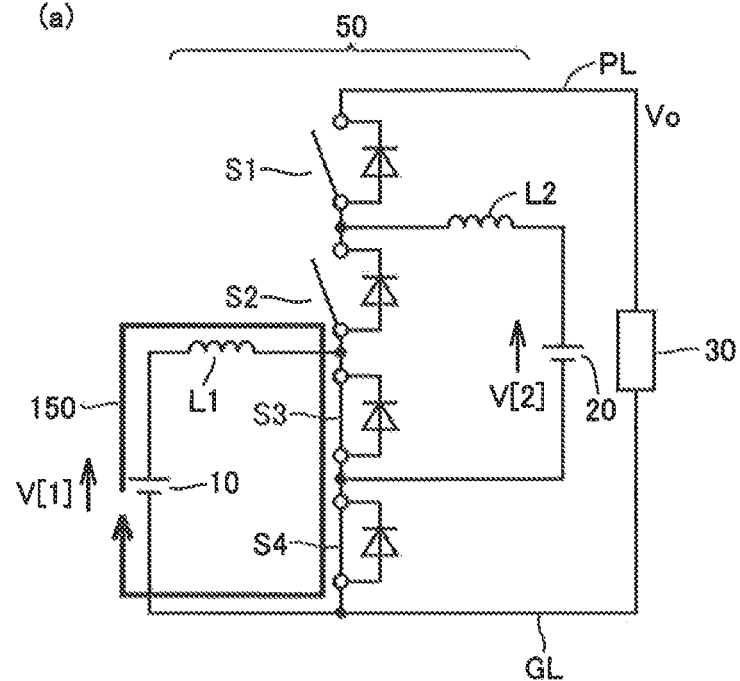
FIG. 7 includes circuit diagrams illustrating a DC/DC conversion (step-up operation) for a first DC power source in the parallel connection mode.
Figure 7:
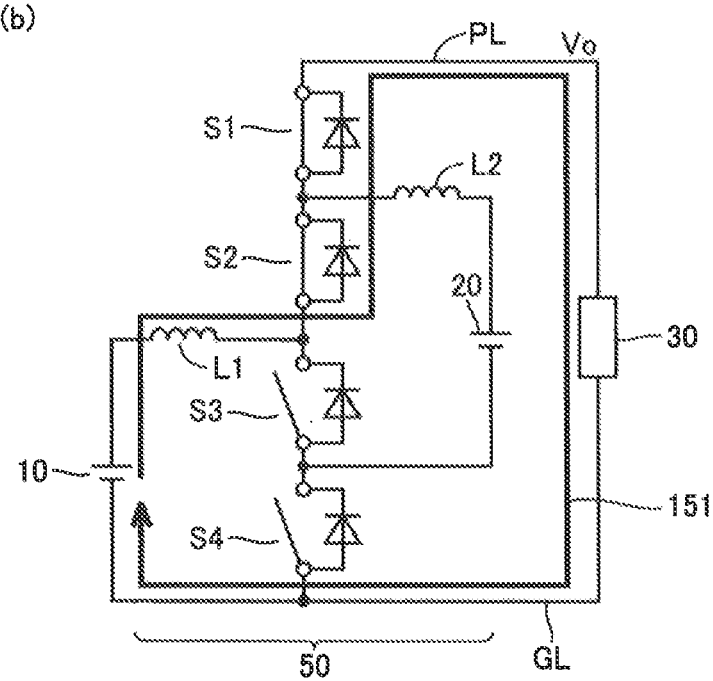

FIG. 7 illustrates a DC/DC conversion (step-up operation) for DC power source 10 in the parallel connection mode.

With reference to FIG. 7(a), when the pair of switching elements S3 and S4 are turned on while the pair of switching elements S1 and S2 are turned off, a current path 150 for storing energy in reactor L1 is formed. Thereby, the on state for the lower arm elements of the step-up chopper circuit is realized.

In contrast, with reference to FIG. 7(b), when the pair of switching elements S1 and S2 are turned on while the pair of switching elements S3 and S4 are turned off, a current path 151 for outputting the energy stored in reactor L1 together with the energy in DC power source 10 is formed. Thereby, the on state for the upper arm elements of the step-up chopper circuit is realized.

By alternately repeating a first period in which the pair of switching elements S3 and S4 are turned on while at least one of the pair of switching elements S and S2 is turned off and a second period in which the pair of switching elements S1 and S2 are turned on while at least one of the pair of switching elements S3 and S4 is turned off, current path 150 of FIG. 7(a) and current path 151 of FIG. 7(b) are formed alternately.

As a result, a step-up chopper circuit having the pair of switching elements S1 and S2 as an equivalent of the upper arm elements and the pair of switching elements S3 and S4 as an equivalent of the lower arm elements is formed for DC power source 10. In the DC/DC conversion operation illustrated in FIG. 7, since there is no current circulation path to DC power source 20, DC power sources 10 and 20 do not interfere with each other. In other words, it is possible to independently control the power input to or output from each of DC power sources 10 and 20.

In such DC/DC conversion, the relationship illustrated in Expression (1) below holds between voltage V[1] of DC power source 10 and output voltage Vo of power line PL. In Expression (1), the duty ratio of the period in which the pair of switching elements S3 and S4 are turned on is denoted by Da.

$$Vo = 1/(1-Da) \cdot V[1] \tag{1}$$

Figure 8:
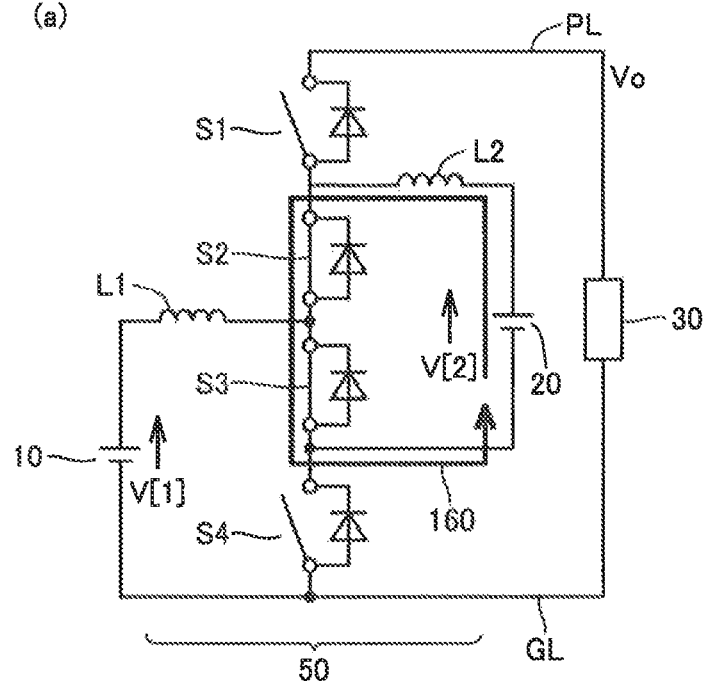
FIG. 8 includes circuit diagrams illustrating a DC/DC conversion (step-up operation) for a second DC power source in the parallel connection mode.
Figure 8:
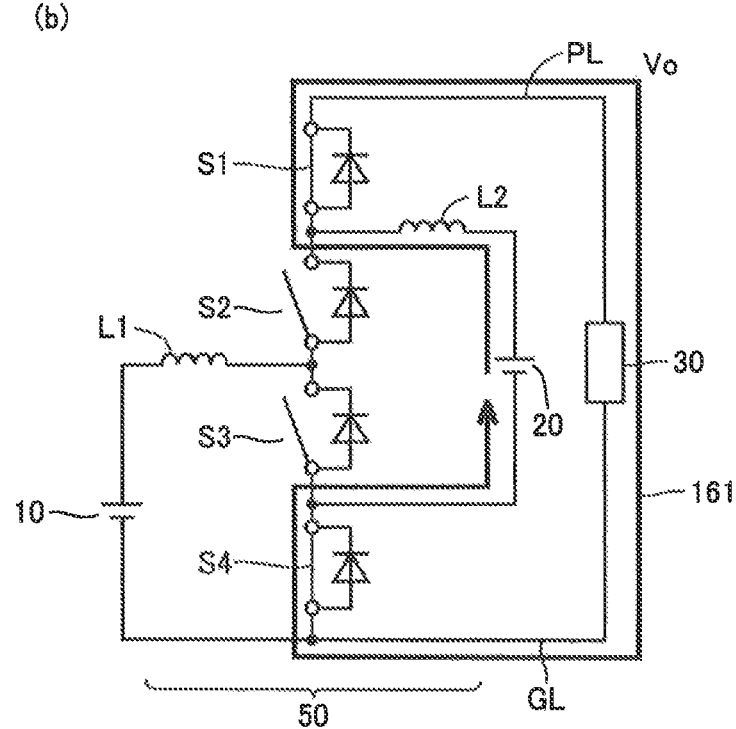

FIG. 8 illustrates a DC/DC conversion (step-up operation) for DC power source 20 in the parallel connection mode.

With reference to FIG. 8(a), when the pair of switching elements S2 and S3 are turned on while the pair of switching elements S1 and S4 are turned off, a current path 160 for storing energy in reactor L2 is formed. Thereby, the on state for the lower arm elements of the step-up chopper circuit is realized.

In contrast, with reference to FIG. 8(b), when the pair of switching elements S1 and S4 are turned on while the pair of switching elements S2 and S3 are turned off, a current path 161 for outputting the energy stored in reactor L2 together with the energy in DC power source 20 is formed. Thereby, the on state for the upper arm elements of the step-up chopper circuit is realized.

By alternately repeating a first period in which the pair of switching elements S2 and S3 are turned on while at least one of the pair of switching elements S1 and S4 is turned off and a second period in which the pair of switching elements S1 and S4 are turned on while at least one of the pair of switching elements S2 and S3 is turned off, current path 160 of FIG. 8(a) and current path 161 of FIG. 8(b) are formed alternately.

As a result, a step-up chopper circuit having the pair of switching elements S1 and S4 as an equivalent of the upper arm elements and the pair of switching elements S2 and S3 as an equivalent of the lower arm elements is formed for DC power source 20. In the DC/DC conversion operation illustrated in FIG. 8, since DC power source 10 is not included in the current path, DC power sources 10 and 20 do not interfere with each other. In other words, it is possible to independently control the power input to or output from each of DC power sources 10 and 20.

In such DC/DC conversion, the relationship illustrated in Expression (2) below holds between voltage V[2] of DC power source 20 and output voltage Vo of power line PL. In Expression (2), the duty ratio of the period in which the pair of switching elements S2 and S3 are turned on is denoted by Db.

$$Vo = 1/(1-Db) \cdot V[2] \tag{2}$$

(Operation in Single Power Source Mode)

The circuit operation in FIG. 7 and the circuit operation in FIG. 8 are common in operations in the single power source mode. In the single power source mode using DC power source 10, the DC voltage conversion can be performed in two directions between DC power source 10 and load 30 without using DC power source 20 according to the switching operations illustrated in FIGS. 7(a) and 7(b).

Similarly, in the single power source mode using DC power source 20, the DC voltage conversion can be performed in two directions between DC power source 20 and load 30 without using DC power source 10 according to the switching operations illustrated in FIGS. 8(a) and 8(b).

(Circuit Operation in Series Connection Mode)

Figure 9:
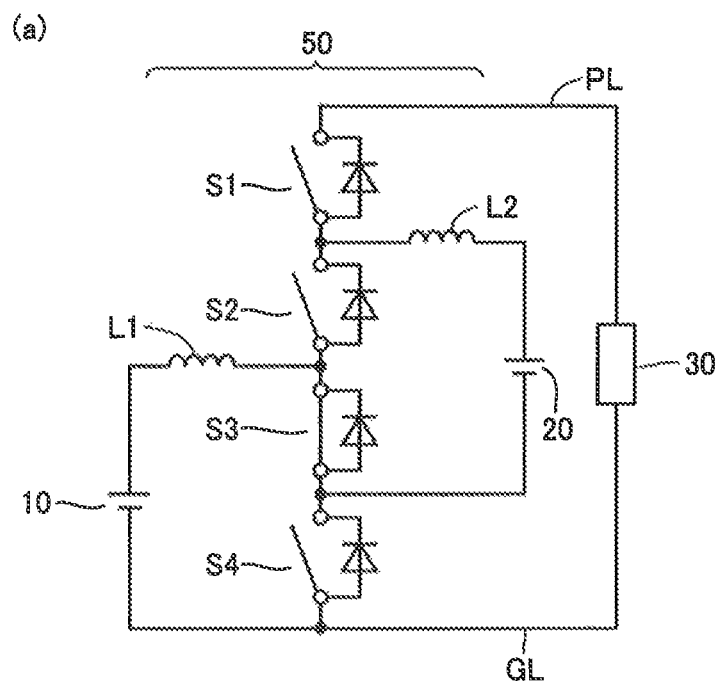
FIG. 9 includes circuit diagrams illustrating a circuit operation in a series connection mode.
Figure 9:
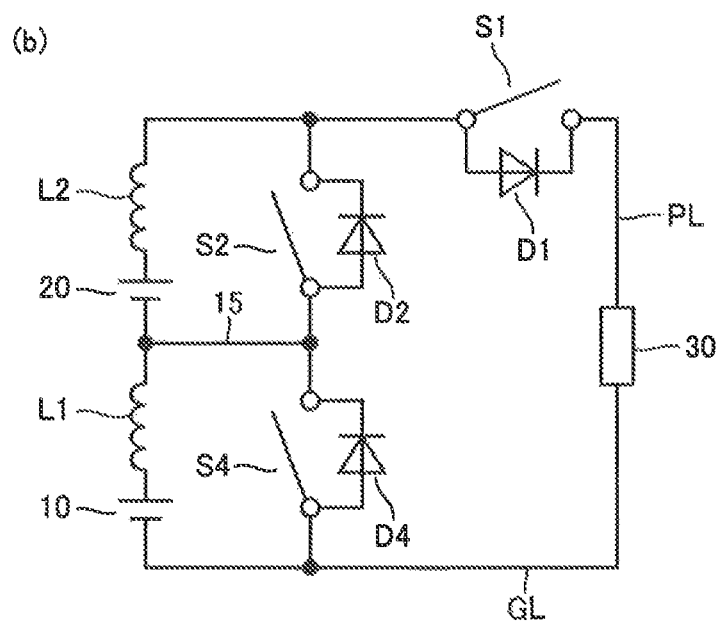

Hereinafter, the circuit operation of power converter 50 in the series connection mode will be described with reference to FIGS. 9 and 10.

As illustrated in FIG. 9(a), when switching element S3 is fixed to the on state, it allows DC power sources 10 and 20 to be connected in series to power line PL. The equivalent circuit at this time is illustrated in FIG. 9(b).

With reference to FIG. 9(b), in the series connection mode, according to the on or off control performed concurrently on switching elements S2 and S4, it is possible to form an on period and an off period alternately for the lower arm elements of the step-up chopper circuit between power line PL and DC power sources 10 and 20 connected in series. Herein, switching element S1 operates as a switch for controlling the regeneration by load 30 as switching elements S2 and S4 are turned on from the off period. Since switching element S3 is fixed to the on state, a line 15 connecting reactor L1 to switching element S4 is formed equivalently.

Next, the DC/DC conversion (step-up operation) in the series connection mode will be described with reference to FIG. 10.

With reference to FIG. 10(a), switching element S3 is fixed to the on state in order to connect DC power sources 10 and 20 in series, the pair of switching elements S2 and S4 are turned on and switching element S1 is turned off. Thereby, current paths 170, 171 for storing energy in reactors L1, L2 are formed. As a result, for DC power sources 10, 20 connected in series, a state in which the lower arm elements of the step-up chopper circuit are turned on is realized.

In contrast, with reference to FIG. 10(b), while switching element S3 is fixed to the on state, and in contrast to FIG. 10(a), the pair of switching elements S2 and S4 are turned off and switching element S1 is turned on. Thereby, a current path 172 is formed. Through current path 172, the sum of the energy from DC power sources 10 and 20 which are connected in series and the energy stored in reactors L1 and L2 is output to power line PL. As a result, for DC power sources 10, 20 connected in series, a state in which the upper arm elements of the step-up chopper circuit are turned on is realized.

Figure 10:
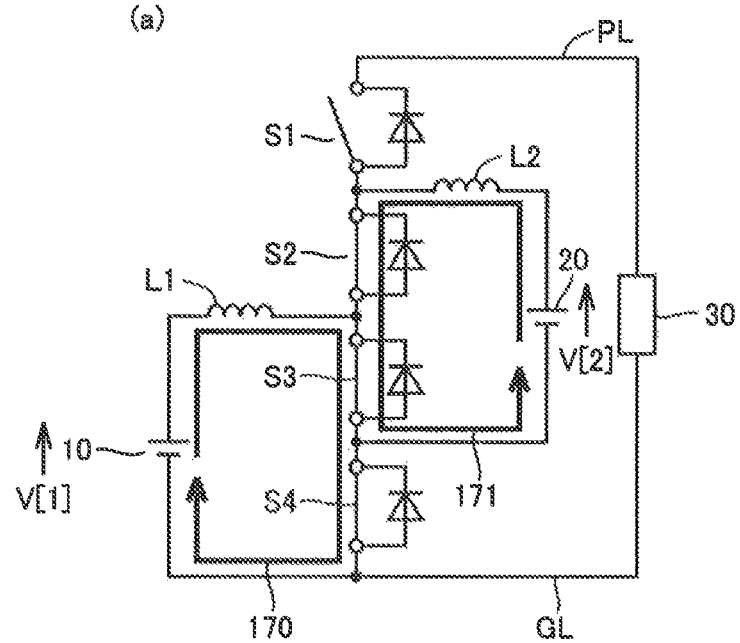
FIG. 10 includes circuit diagrams illustrating a DC/DC conversion (step-up operation) in the series connection mode.
Figure 10:
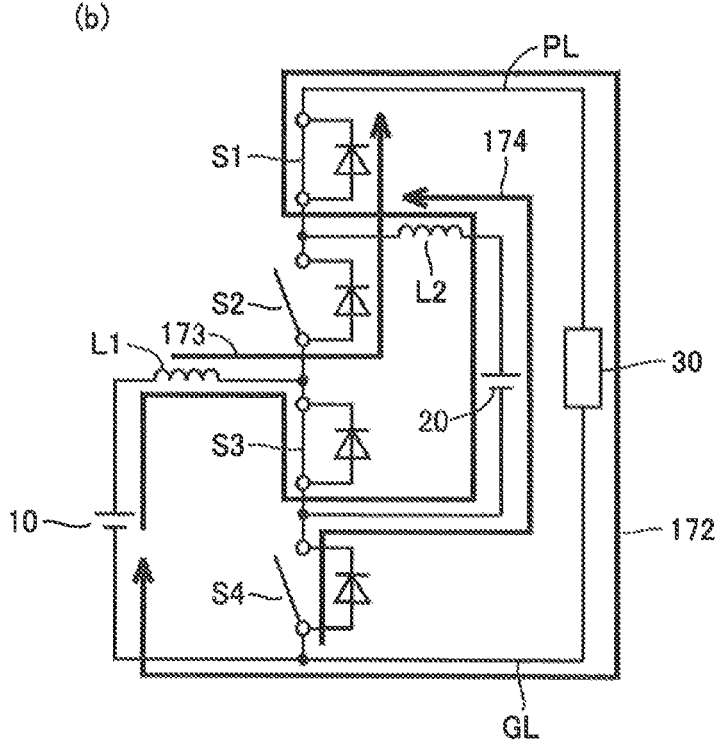

With switching elements S3 being fixed to the on state, by alternately repeating to a first period in which the pair of switching elements S2 and S4 are turned on and switching element S1 is turned off and a second period in which switching element S1 is turned on and switching elements S2 and S4 is turned off, current paths 170, 171 of FIG. 10(*a*) and current path 172 of FIG. 10(*b*) are formed alternately.

In the DC/DC conversion in the series connection mode, the relationship illustrated in Expression (3) below holds among voltage V[1] of DC power source 10, voltage V[2] of DC power source 20 and output voltage Vo of power line PL. In Expression (3), the duty ratio of the first period in which the pair of switching elements S2 and S3 are turned on is denoted by Dc.

$$Vo=1/(1-Dc)\cdot(V[1]+V[2]) \quad (3)$$

It is noted, however, that if V[1] and V[2] are different or if reactors L1 and L2 have different inductances, reactors L1 and L2 come to have different current values at the end of operation in FIG. 10(*a*). Therefore, immediately after the transition to the operation in FIG. 10(*b*), if the current of the reactor L1 is greater, a difference current flows through a current path 173. On the other hand, if the current of the reactor L2 is greater, a difference current flows through a current path 174.

Hereinafter, the control operation of power converter 50 in each operation mode will be described. First, the control operation in the parallel connection mode will be described with reference to FIGS. 11 to 16.

(Control Operation in Parallel Connection Mode)

Figure 11:
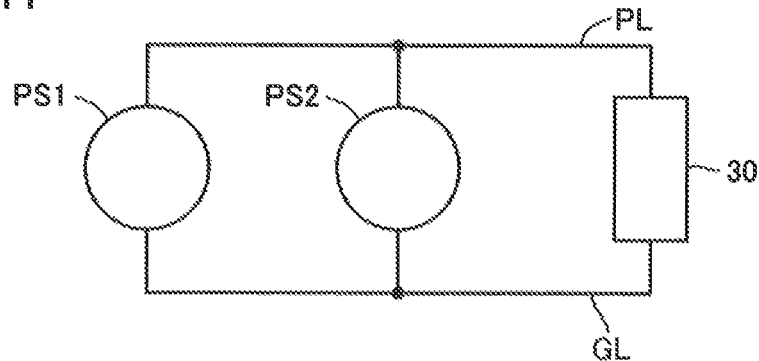
FIG. 11 is a block diagram illustrating an equivalent circuit viewed from the load side in the parallel connection mode.

FIG. 11 illustrates an equivalent circuit viewed from the load side in the parallel connection mode.

With reference to FIG. 11, in the parallel connection mode, a power source PS1 which performs the DC power conversion between DC power source 10 and load 30, and a power source PS2 which performs the DC power conversion between DC power source 20 and load 30 exchange power with load 30 in parallel. Power source PS1 corresponds to the step-up chopper circuit which performs the DC voltage conversion operations illustrated in FIG. 7. Similarly, power source PS2 corresponds to the step-up chopper circuit which performs the DC voltage conversion operations illustrated in FIG. 8.

Specifically, power source PS1 has a function of performing the DC voltage conversion between voltage V[1] of DC power source 10 and output voltage Vo according to the voltage conversion ratio denoted in Expression (1). Similarly, power source PS2 has a function of performing the DC voltage conversion between voltage V[2] of DC power source 10 and output voltage Vo according to the voltage conversion ratio denoted in Expression (2).

In the parallel connection mode, if a common control (voltage control of output voltage Vo) is performed at both power sources concurrently, power sources PS1 and PS2 come to be connected in parallel on the side of the load, and therefore, the circuit failure may occur. Thus, one of power sources PS1 and PS2 operates as a voltage source for controlling output voltage Vo, and the other one of power sources PS1 and PS2 operates as a current source for regulating the current of the power source to a current command value. The voltage conversion ratio of each of power sources PS1 and PS2 is controlled such that each power source operates either as a current source or as a voltage source.

In the case where power source PS1 is controlled to operate as the current source and power source PS2 is controlled to operate as the voltage source, the relationship illustrated in Expression (4) below holds among an electric power P[1] of DC power source 10, an electric power P[2] of DC power source 20, a power Po of load 30, and a current command value Ii* in the current source.

$$P[2]=Po-P[1]=Po-V[1]\cdot Ii^* \quad (4)$$

If current command value Ii* is set to make P*=V[1]·Ii* constant in response to the detection value of voltage V[1] of DC power source 10, electric power P[1] of DC power source 10 forming the current source can be regulated to a power command value Pi*.

In contrast, in the case where power source PS2 is controlled to operate as the current source and power source PS1 is controlled to operate as the voltage source, the relationship illustrated in Expression (5) below holds.

$$P[1]=Po-P[2]=Po-V[2]\cdot Ii^* \quad (5)$$

Similarly, if current command value Ii* is set to make P*=V[2]·Ii* constant, electric power P[2] of DC power source 20 forming the current source can be regulated to power command value Pi*.

Figure 12:
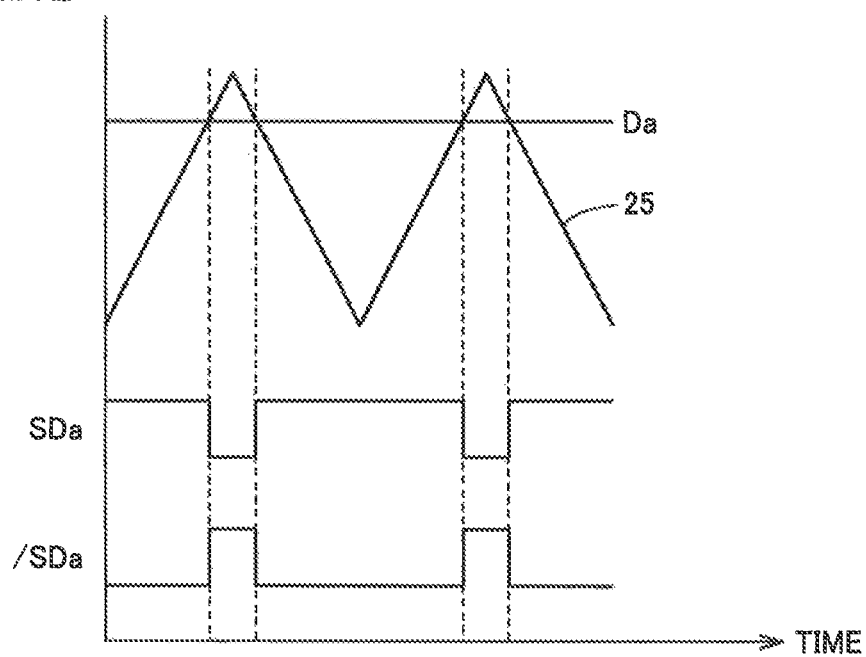
FIG. 12 is a waveform diagram illustrating an exemplary control operation on the first power source.

FIG. 12 illustrates a waveform diagram for explaining specifically an exemplary control operation for controlling power source PS1 corresponding to DC power source 10.

With reference to FIG. 12, duty ratio Da (see Expression (1)) of power source PS1 is calculated according to a voltage feedback control (FIG. 14) for making it operate as the voltage source or according to a current feedback control (FIG. 15) for making it operate as the current source. Note that the voltage signal indicating duty ratio Da is denoted by the same symbol Da in FIG. 12.

A control pulse signal SDa of power source PS1 is generated according to a pulse width modulation (PWM) control based on a comparison between duty ratio Da and a periodic carrier signal 25. Generally, a triangular wave is used for carrier signal 25. The period of carrier signal 25 corresponds to the switching frequency of each switching element, and the amplitude of carrier signal 25 is set to a voltage corresponding to Da=1.0.

Control pulse signal SDa is set to a logic high level (hereinafter, referred to as H level) if the voltage indicating duty ratio Da is higher than the voltage of carrier signal 25, and is set to a logic low level (hereinafter, referred to as L level) if the voltage indicating duty ratio Da is lower than the voltage of carrier signal 25. A control pulse signal /SDa is an inversion signal of control pulse signal SDa. As duty ratio Da becomes higher, the H level period of control pulse signal SDa becomes longer. On the contrary, as duty ratio Da becomes lower, the L level period of control pulse signal SDa becomes longer.

Thus, control pulse signal SDa corresponds to the signal for controlling the on or off of the lower arm elements of the step-up chopper circuit illustrated in FIG. 7. Specifically, the lower arm elements are turned on during the H level period of control pulse signal SDa, and the lower arm elements are turned off during the L level period thereof. On the other hand, control pulse signal /SDa corresponds to the signal for controlling the on or off of the upper arm elements of the step-up chopper circuit illustrated in FIG. 7.

Figure 13:
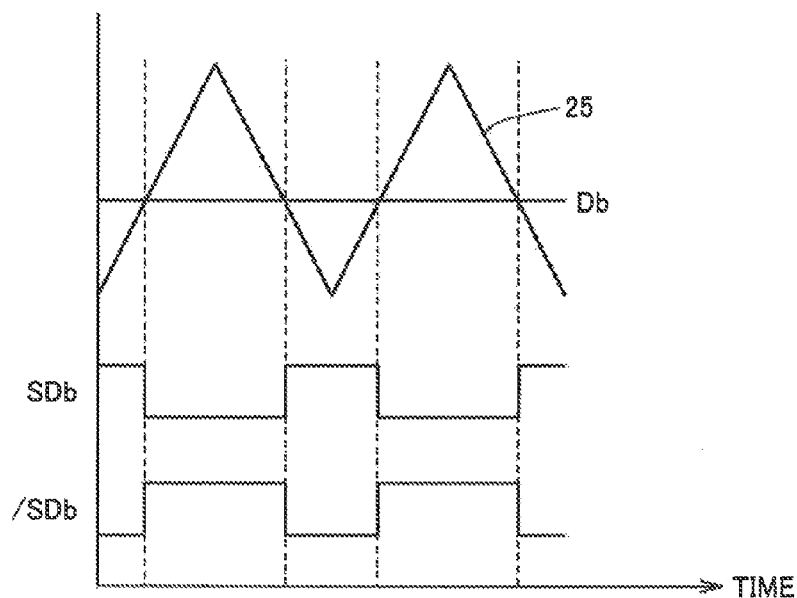
FIG. 13 is a waveform diagram illustrating an exemplary control operation on the second power source.

FIG. 13 illustrates a waveform diagram for explaining specifically an exemplary control operation for controlling power source PS2 corresponding to DC power source 20.

With reference to FIG. 13, in power source PS2 also, by the pulse width modulation control similar to that for power source PS1, a control pulse signal SDb and its inversion signal /SDb are generated, based on duty ration Db (see Expression (2)). Therefore, control pulse signal SDa corresponds to the signal for controlling the on or off of the lower arm elements of the step-up chopper circuit illustrated in FIG. 8. Control pulse signal /SDa corresponds to the signal for controlling the on or off of the upper arm elements of the step-up chopper circuit illustrated in FIG. 8.

If power source PS1 operates as the voltage source, duty ratio Db is calculated according to the voltage feedback control (FIG. 15) for making power source PS2 operate as the current source. On the contrary, If power source PS1 operates as the current source, duty ratio Db is calculated according to the voltage feedback control (FIG. 14) for making power source PS2 operate as the voltage source.

Figure 14:
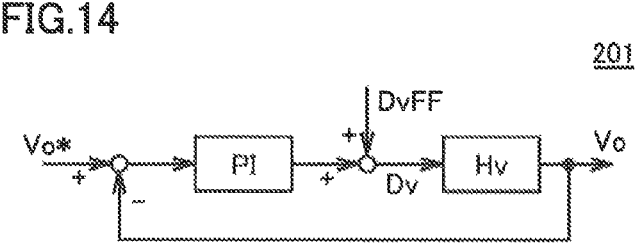
FIG. 14 is a diagram illustrating an exemplary configuration of a control block for a power source operating as a voltage source.

FIG. 14 illustrates an exemplary configuration of a control block 201 for a power source which operates as a voltage source.

With reference to FIG. 14, control block 201 generates a duty command value Dv for the voltage control in accordance with a sum of a feedback control amount, which is obtained through performing a PI (proportional integral) operation on the difference between voltage command value Vo* and output voltage Vo, and a feedforward control amount DvFF. A transfer function Hv corresponds to the transfer function of power source PS1 or PS2 which operates as a voltage source.

Figure 15:
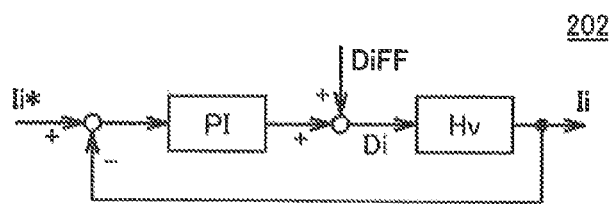
FIG. 15 is a diagram illustrating an exemplary configuration of a control block for a power source operating as a current source.

FIG. 15 illustrates an exemplary configuration of a control block 202 for a power source which operates as a current source.

With reference to FIG. 15, control block 202 generates a duty command value Di for the current control in accordance with a sum of a feedback control amount obtained through performing a PI (proportional integral) operation on the difference between current command value Ii* and current Ii of DC power source 10 or 20 undergoing current control, and a feedforward control amount DiFF. A transfer function Hi corresponds to the transfer function of power source PS1 or PS2 which operates as a current source.

Figures 16, 17:
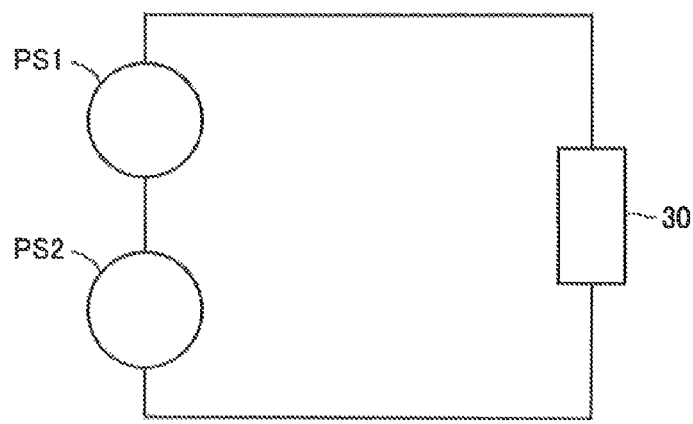
FIG. 16 is a table illustrating the settings of various control data in the parallel connection mode.
FIG. 17 is a block diagram illustrating an equivalent circuit viewed from the load side in the series connection mode.

FIG. 16 illustrates the settings of various control data in the parallel connection mode. The left column of the table in FIG. 16 shows various control data when power source PS1 (DC power source 10) is controlled to operate as the current source and power source PS2 (DC power source 20) is controlled to operate as the voltage source.

With reference to the left column of FIG. 16, duty ratio command value Dv for the voltage control is used as duty ratio Db of power source PS2 (DC power source 20), and duty ratio command value Di for the current control is used as duty ratio Da of the power source PS1 (DC power source 10). Current Ii which is controlled by the current control is current I[1] of DC power source 10. The voltage which is controlled by the voltage control is output voltage Vo when any of power sources PS1 and PS2 is controlled to operate as the voltage source.

Transfer function Hv in FIG. 14 corresponds to the transfer function of the step-up chopper circuit corresponding to DC power source 20 illustrated in FIG. 8. Transfer function Hi in FIG. 15 corresponds to the transfer function of the step-up chopper circuit corresponding to DC power source 10 illustrated in FIG. 7.

As illustrated in Expression (6) below, feedforward control amount DvFF in the voltage control is set according to the voltage difference between output voltage Vo and voltage V[2] of DC power source 20. Further, as illustrated in Expression (7) below, feedforward control amount DiFF in the current control is set according to the voltage difference between output voltage Vo and voltage V[1] of DC power source 10.

$$DvFF=(Vo-V[2])/Vo \quad (6)$$

$$DiFF=(Vo-V[1])/Vo \quad (7)$$

Control pulse signals SDa and /SDa illustrated in FIG. 12 are generated according to duty ratio Da (Da=Di). Similarly, control pulse signals SDb and /SDb illustrated in FIG. 13 are generated according to duty ratio Db (Db=Dv).

Control signals SG1 to SG4 for controlling the on or off of switching elements S1 to S4, respectively, are set in accordance with a logical sum of the control pulse signal for the current control of power source PS1 and the control pulse signal for the voltage control of power source PS2.

Switching element S1 forms an upper arm element in each of the step-up chopper circuits illustrated in FIG. 7 and FIG. 8. Therefore, control signal SG1 for controlling the on or off of switching element S1 is generated according to the logical sum of control pulse signals /SDa and /SDb. Specifically, control signal SG1 is set to the H level at least one of control pulse signals /SDa and /SDb is at the H level. Control signal SG1 is set to the L level in a period in which control pulse signals /SDa and /SDb are both at the L level.

As a result, the on or off of switching element S1 is controlled so that it functions both as an upper arm element in the step-up chopper circuit (DC power source 10) of FIG. 7 and as an upper arm element in step-up chopper circuit (DC power source 20) of FIG. 8.

Switching element S2 forms an upper arm element in the step-up chopper circuit of FIG. 7 and a lower arm element in the step-up chopper circuit of FIG. 8. Therefore, control signal SG2 for controlling the on or off of switching element S2 is generated according to the logical sum of control pulse signals /SDa and SDb. As a result, the on or off of switching element S2 is controlled so that it functions both as an upper arm element in the step-up chopper circuit (DC power source 10) of FIG. 7 and as a lower arm element in step-up chopper circuit (DC power source 20) of FIG. 8.

Similarly, control signal SG3 for switching element S3 is generated according to the logical sum of control pulse signals SDa and SDb. Thus, the on or off of switching element S3 is controlled so that it functions both as a lower arm element in the step-up chopper circuit (DC power source 10) of FIG. 7 and as a lower arm element in step-up chopper circuit (DC power source 20) of FIG. 8.

Further, control signal SG4 for switching element S4 is generated according to the logical sum of control pulse signals SDa and /SDb. Thus, the on or off of switching element S4 is controlled so that it functions both as a lower arm element in the step-up chopper circuit (DC power source 10) of FIG. 7 and as an upper arm element in step-up chopper circuit (DC power source 20) of FIG. 8.

The right column of the table in FIG. 16 shows the settings of various control data when power source PS1 (DC power source 10) is controlled to operate as a voltage source and power source PS2 (DC power source 20) is controlled to operate as a current source.

With reference to the right column of FIG. 16, duty ratio command value Dv for the voltage control is used as duty ratio Da of power source PS1 (DC power source 10), and duty ratio command value Di for the current control is used as duty ratio Da of the power source PS2 (DC power source 20). Current Ii which is controlled by the current control is current I[2] of DC power source 20. The voltage which is controlled by the voltage control is output voltage Vo.

Transfer function Hv in FIG. 14 corresponds to the transfer function of the step-up chopper circuit corresponding to DC power source 10 illustrated in FIG. 7. Transfer function Hi in FIG. 15 corresponds to the transfer function of the step-up chopper circuit corresponding to DC power source 20 illustrated in FIG. 8.

As illustrated in Expression (8) below, feedforward control amount DvFF in the voltage control is set according to the voltage difference between output voltage Vo and voltage V[1] of DC power source 20. As illustrated in Expression (9) below, feedforward control amount DiFF in the current control is set according to the voltage difference between output voltage Vo and voltage V[2] of DC power source 10.

$$DvFF=(Vo-V[1])/Vo \quad (8)$$

$$DiFF=(Vo-V[2])/Vo \quad (9)$$

Control pulse signals SDa and /SDa illustrated in FIG. 12 are generated according to duty ratio Da (Da=Dv). Similarly, control pulse signals SDb and /SDb illustrated in FIG. 13 are generated according to duty ratio Db (Db=Di).

Control signals SG1 to SG4 for controlling the on or off of switching elements S1 to S4, respectively, are set in accordance with the logical sum of the control pulse signal for the voltage control of power source PS1 and the control pulse signal for the current control of power source PS2. Thus, control signals SG1 to SG4 for switching elements S1 to S4 are generated in the same manner as indicated on the left column of FIG. 16.

In the parallel connection mode, since control signals SG2 and SG4 are set to complementary levels, switching elements S2 and S4 are turned on or off in a complementary manner. Thereby, the operation when V[2]>V[1] as illustrated in FIG. 5 and the operation when V[1]>V[2] are switched spontaneously. Furthermore, by switching on or off switching elements S1 and S3 in a complementary manner in each operation, it is possible to perform the DC voltage conversion in accordance with duty ratios Da and Db in power sources PS1 and PS2, respectively.

In the parallel connection mode, it is possible to control the output power of DC power sources 10 and 20 according to the current control of one of the DC power sources while controlling output voltage Vo. Therefore, in the parallel connection mode, the power management on DC power sources 10 and 20 can be improved. Further, since DC power sources 10 and 20 are connected in parallel, the adaptability to a charging/discharging request from load 30 can be made excellent.

(Control Operation in Single Power Source Mode)

As described above, in the single power source mode using DC power source 10, the switching operations illustrated in FIGS. 7(a) and 7(b) are performed. Thus, duty ratio command value Dv for the voltage control is used as duty ratio Da of DC power source 10 so that output voltage Vo is controlled at the voltage command value by control block 201 illustrated in FIG. 14. Thereby, control signals SG1 to SG4 are controlled according to control pulse signals SDa and /SDa for the voltage control of DC power source 10. Specifically, control signals SG1 and SG2 for switching elements S1 and S2 corresponding to the upper arm elements are set according to control pulse signal /SDa, and control signals SG3 and SG4 for switching elements S3 and S4 corresponding to the lower arm elements are set according to control pulse signal SDa.

Further, in the single power source mode using DC power source 20, the switching operations illustrated in FIGS. 8(a) and 8(b) are performed. Thus, duty ratio command value Dv for the voltage control is used as duty ratio Db of DC power source 20 so that output voltage Vo is controlled at the voltage command value by control block 201 illustrated in FIG. 14. Thereby, control signals SG1 to SG4 are controlled according to control pulse signals SDb and /SDb for the voltage control of DC power source 20. Specifically, control signals SG1 and SG4 for switching elements S1 and S4 corresponding to the upper arm elements are set according to control pulse signal /SDb, and control signals SG2 and SG3 for switching elements S2 and S3 corresponding to the lower arm elements are set according to control pulse signal SDb.

As described above, it is possible for the single power source mode to cope with the case where it is efficient to use only one of the DC power sources.

(Control Operation in Series Connection Mode)

Hereinafter, the control operation in the series connection mode will be described with reference to FIGS. 17 to 20.

FIG. 17 illustrates an equivalent circuit viewed from the load side in the series connection mode.

With reference to FIG. 17, in the series connection mode, power sources PS1 and PS2 are connected in series to load 30. Therefore, the current flowing through power source PS1 and the current flowing through power source PS2 are common. Thus, in order to control output voltage Vo, it is necessary that power sources PS1 and PS2 are commonly voltage-controlled.

Power sources PS1 and PS2 which are connected in series correspond to the step-up chopper circuit which performing the DC voltage conversion operation illustrated in FIG. 10. Specifically, power sources PS1 and PS2 have a function of performing the DC voltage conversion between the sum of voltages V[1] and V[2] of DC power sources 10 and 20 and output voltage Vo according to the voltage conversion ratio denoted in Expression (3).

In the series connection mode, it is not possible to directly control electric power P[1] of DC power source 10 and electric power P[2] of DC power source 20. The relationship illustrated in Expression (10) below holds between electric power P[1] and voltage V[1] of DC power source 10, and electric power P[2] and voltage V[2] of DC power source 20. Note that, similar to the parallel connection mode, the sum of electric power P[1] and electric power P[2] equals to power Po of load 30 (Po=P[1]+P[2]).

$$P[1]:P[2]=V[1]:V[2] \quad (10)$$

Figure 18:
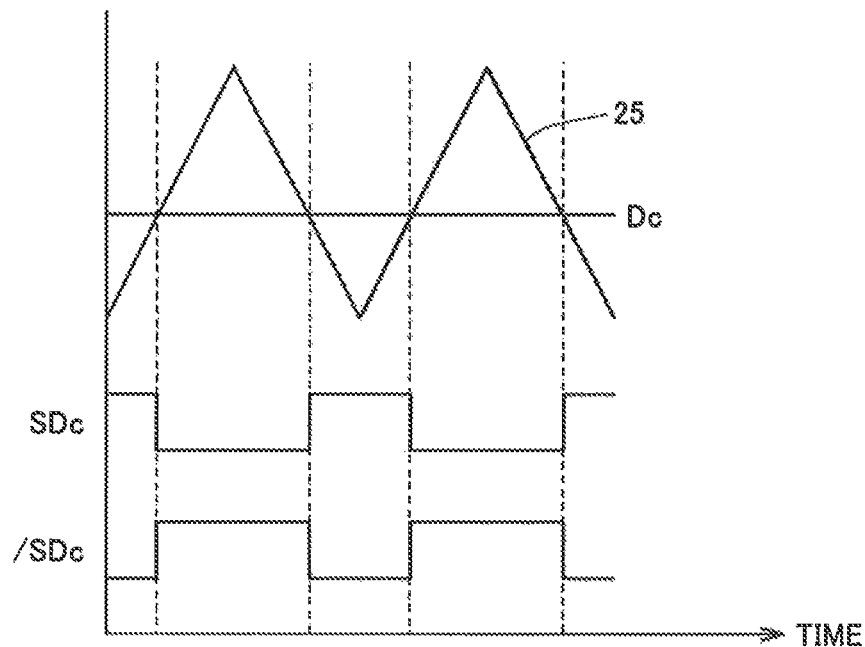
FIG. 18 is a waveform diagram illustrating an exemplary control operation in the series connection mode.

With reference to FIG. 18, duty ratio Dc (see Expression (3)) common in power sources PS1 and PS2 is calculated according to a voltage feedback control (FIG. 19) for making the power sources operate as the voltage source. Note that a voltage signal indicating duty ratio Dc is denoted by the same symbol Dc in FIG. 18.

A control pulse signal SDc is generated based on duty ratio Dc (see Expression (3)) according to the pulse width modulation control similar to that in FIG. 12 and FIG. 13. A control pulse signal /SDc is an inversion signal of control pulse signal SDc. Control pulse signal SDc corresponds to the signal for controlling the on or off of the lower arm elements in the step-up chopper circuit illustrated in FIG. 10. On the other hand, control pulse signal /SDc corresponds to the signal for controlling the on or off of the upper arm elements in the step-up chopper circuit illustrated in FIG. 10.

Figure 19:
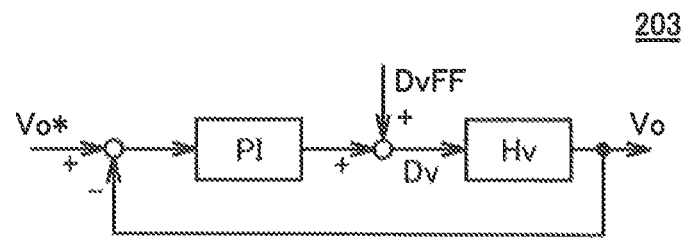
FIG. 19 is a diagram illustrating an exemplary configuration of a control block for a power source in the series connection mode.

FIG. 19 illustrates an exemplary configuration of a control block 203 in the series connection mode.

With reference to FIG. 19, control block 203 generates duty command value Dv for the voltage control in accordance with a sum of a feedback control amount which is obtained through performing a PI (proportional integral) operation on the difference between voltage command value Vo* and output voltage Vo, and feedforward control amount DvFF. Transfer function Hv corresponds to the transfer function of power sources PS1 and PS2 which are connected in series.

Figures 20, 21:
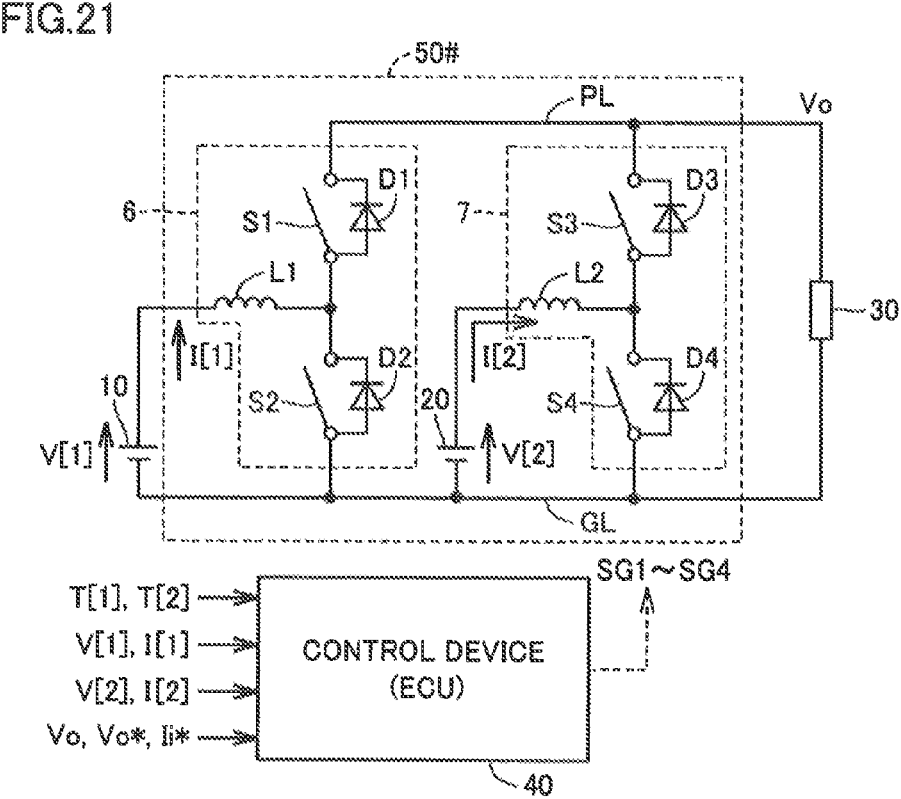
FIG. 20 is a table illustrating the settings of various control data in the series connection mode.
FIG. 21 is a circuit diagram illustrating a power converter of a comparative example.

FIG. 20 shows the settings of various control data in the series connection mode.

With reference to FIG. 20, duty ratio command value Dv illustrated in FIG. 19 for the voltage control is used as duty ratio Dc. The voltage which is controlled by the voltage control is output voltage Vo. Transfer function Hv in FIG. 19 corresponds to the transfer function of the step-up chopper circuit illustrated in FIG. 10. As illustrated in Expression (11) below, feedforward control amount DvFF is set according to the voltage difference between voltage V[1]+V[2] of the serial-connected power source and output voltage Vo.

$$DvFF=(Vo-(V[2]+V[1]))/Vo \qquad (11)$$

Control pulse signals SDc and /SDc illustrated in FIG. 18 are generated according to duty ratio Dc (Dc=Dv).

Control signals SG1 to SG4 for controlling the on or off of switching elements S1 to S4, respectively, are set according to control pulse signals SDc and /SDc so as to control the step-up chopper circuit illustrated in FIG. 10.

In the series connection mode, by fixing switching element S3 to the on state, DC power sources 10 and 20 are connected in series. Therefore, control signal SG3 is fixed at the H level.

Switching element S1 forms an upper arm element in the step-up chopper circuit of FIG. 10. Thus, control pulse signal /SDc is used as control signal SG1. Switching elements S2 and S4 form the lower arm elements in the step-up chopper circuit of FIG. 10. Thus, control pulse signal SDc is used as control signals SG2 and SG4.

Since the DC voltage conversion is performed between voltage V[1]+V[2] and output voltage Vo in the series connection mode, the duty ratio of the chopper circuit is smaller than that in the parallel connection mode. Thus, even though the energy storage (SOC: State of Charge) in DC power sources 10 and 20 is lower, which consequently makes voltage V[1] and voltage V[2] lower, it is possible to perform the DC voltage conversion. Therefore, the series connection mode is advantageous from the viewpoint of efficiently using up the energy stored in DC power sources 10 and 20. Further, the current at the time of inputting or outputting the same amount of electric power in the series connection mode is smaller than that in the parallel connection mode. Therefore, the series connection mode is advantageous from the viewpoint of efficiency.

(Control of Switching Speed of Power Converter)

As mentioned, in accordance with the control of the plurality of switching elements S1 to S4, power converter 50 can operate independently in the parallel connection mode to improve the power adaptability and the power management for the load, in the series connection mode superior in efficiency and utilization of the stored energy, and in the single power source mode to cope with the case where it is efficient to use only one of the DC power sources.

In the single power source mode, since every two of switching elements are controlled on or off concurrently, it is concerned that the power loss in the switching elements may increase. Specifically, in the single power source mode using DC power source 10, while switching elements S1 and S2 are being controlled on or off concurrently, switching elements S3 and S4 are controlled on or off concurrently (see FIG. 7). Similarly, in the single power source mode using DC power source 20, while switching elements S1 and S4 are being controlled on or off concurrently, switching elements S2 and S3 are controlled on or off concurrently (see FIG. 8). On the other hand, in the parallel connection mode, each of the Switching elements S1 to S4 is controlled on or off independently. In other words, in power converter 50, the parallel connection mode corresponds to the "first mode", and the single power source mode corresponds to the "second mode."

FIG. 21 illustrates a configuration of a power converter 50# as a comparative example in which DC power sources 10 and 20 can be used in parallel.

With reference to FIG. 21, power converter 50# of the comparative example includes a chopper circuit 6 and a chopper circuit 7. Chopper circuit 6 performs the DC/DC conversion in two directions between DC power source 10 and power line PL connected to load 30. Chopper circuit 6 includes switching elements S1 and S2, and reactor L1.

Chopper circuit 7 performs the DC/DC conversion in two directions between DC power source 20 and power line PL connected to load 30. Chopper circuit 7 includes switching elements S3 and S4, and reactor L2.

Thus, different from power converter 50 according to the present embodiment, power converter 50# is configured such that chopper circuits 6 and 7 are disposed independently for DC power sources 10 and 20, respectively. Chopper circuits 6 and 7 can be controlled independently.

For example, similar to FIG. 14 and FIG. 15, chopper circuits 6 and 7 are controlled to have one of DC power sources 10 and 20 operate as a voltage source and the other one as a current source. For example, similar to FIG. 15, chopper circuit 6 performs a voltage control to match output voltage Vo with voltage command value Vo*. Thereby, switching elements S1 and S2 are controlled according to duty ratio Da (control pulse signals SDa and /SDa) for the voltage control. In contrast, similar to FIG. 14, chopper circuit 7 performs a current control to match current I[2] with current command value Ii*. Thereby, switching elements S3 and S4 are controlled according to duty ratio Db (control pulse signals SDa and /SDa) for the current control.

Thus, in power converter 50#, by making chopper circuit 6 and 7 operate in parallel, it is possible to perform the DC/DC conversion in parallel between DC power sources 10 and 20 and load 30, similar to that in the parallel connection mode of power converter 50. Furthermore, it is possible for power converter 50# to realize the single power source mode using DC power source 10 or 20 by actuating only chopper circuit 6 or 7.

Figure 22:
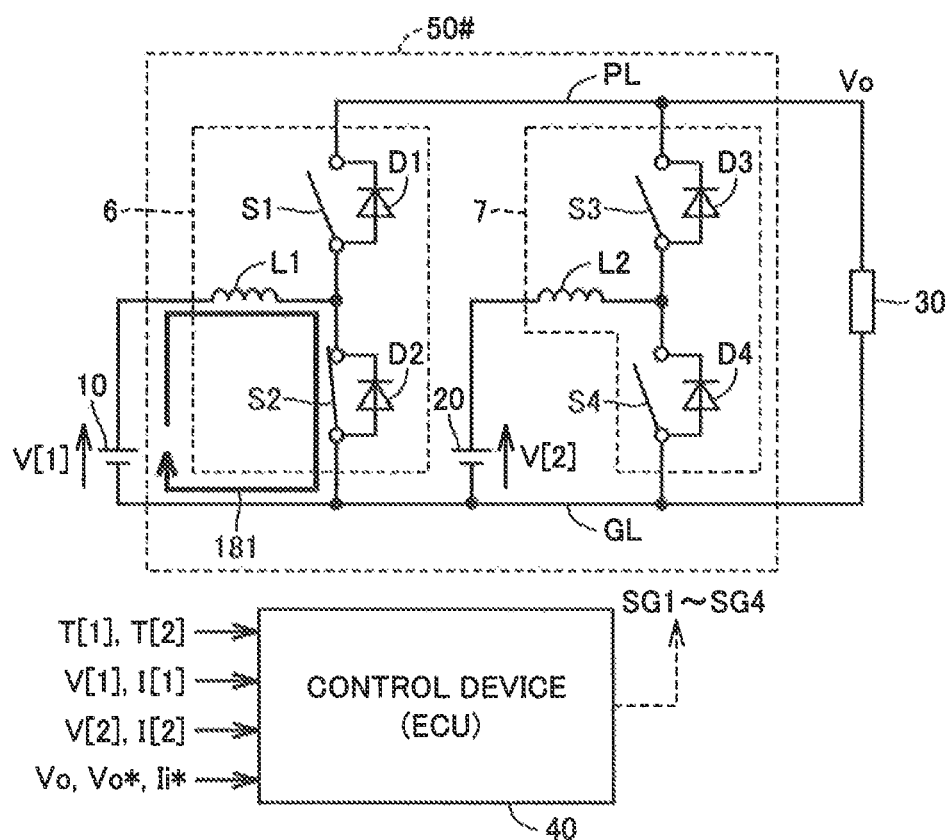
FIG. 22 is a first circuit diagram illustrating operations of the power converter of the comparative example in a single power source mode.
Figure 23:
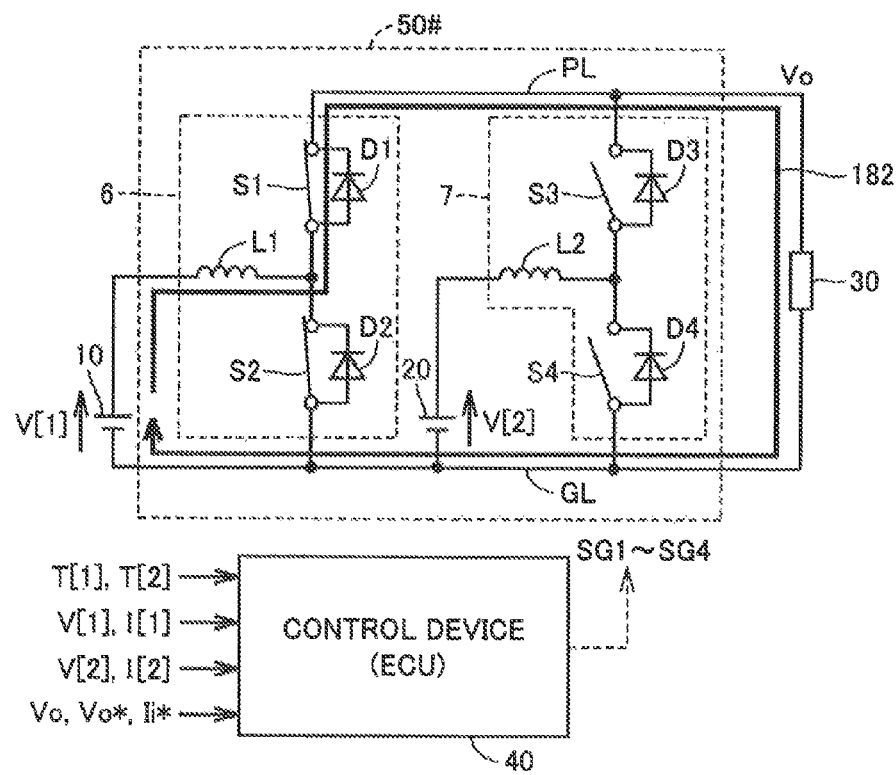
FIG. 23 is a second circuit diagram illustrating operations of the power converter of the comparative example in a single power source mode.

FIG. 22 and FIG. 23 each illustrates a circuit diagram for explaining the operations of power converter 50# in the single power source mode. The operations of chopper circuit 6 in the single power source mode using a DC power source 10 are illustrated in FIG. 22 and FIG. 23.

With reference to FIG. 22, in chopper circuit 6, by turning off the upper arm element, namely switching element S1 and turning on the lower arm element, namely switching element S2, a current path 181 for storing electromagnetic energy in reactor L1 is formed.

With reference to FIG. 23, in chopper circuit 6, by turning off the lower arm element (switching element S2) and turning on the upper arm element (switching element S1), a current path 182 for supplying power to load 30 is formed.

Thus, in chopper circuit 6, by alternately turning on or off the switching elements one by one, it is possible to realize the single mode power using DC power source 10. Similarly, in chopper circuit 7, by alternately turning on or off switching element S3 (upper arm element) and switching element S4 (lower arm element), it is possible to realize the single mode power using DC power source 20.

Therefore, in comparing the power conversion by the single power source mode, power converter 50 according to the present embodiment includes two switching elements in the current path, as compared with power converter 50# of the comparative example, it is concerned that the loss may increase (approximately 2-fold). Thus, in power converter 50 according to the present embodiment, the switching speed of each of switching elements S1 to S4 is controlled in accordance with the operation mode.

Figure 24:
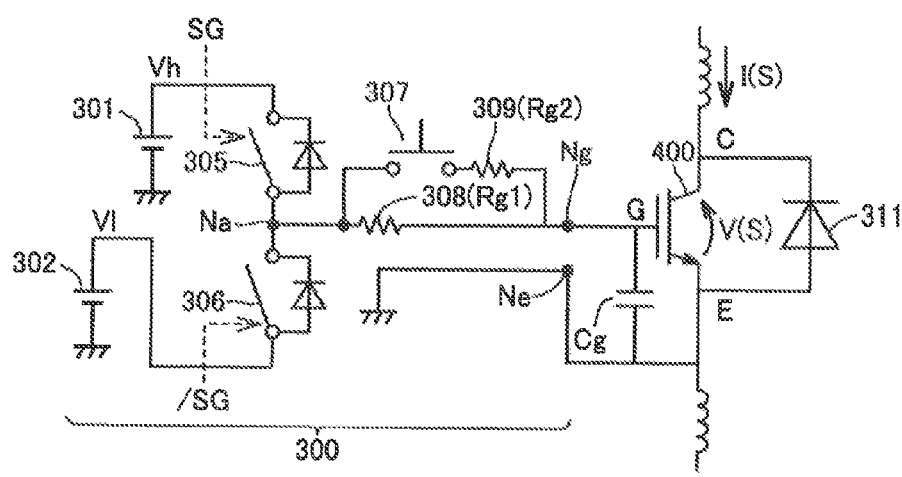
FIG. 24 is a circuit diagram illustrating an exemplary configuration of a drive control circuit provided for each switching element in the power converter according to an embodiment of the present invention.

FIG. 24 is a circuit diagram illustrating an exemplary configuration of a drive control circuit provided for each switching element in the power converter according to an embodiment of the present invention.

With reference to FIG. 24, through driving a current or a voltage to a control electrode of a switching element 400, a drive control circuit 300 controls the on or off of the switching element 400 in response to a control signal SG. Switching element 400 is used to inclusively represent switching elements S1 to S4, and control signal SG is used to inclusively represent control signals SG1 to SG4.

Switching element 400 is illustrated as an IGBT (Insulated Gate Bipolar Transistor). Switching element 400 is configured to have a current I(S) circulate between two terminals (between a collector (C) and an emitter (E)) in accordance with the voltage of a gate (G), namely the "control electrode". Specifically, switching element 400 is turned on when a gate voltage V(G) is higher than a predetermined threshold voltage, and is turned off when the gate voltage is lower than the predetermined threshold voltage. The terminal-terminal voltage (collector-emitter voltage) of switching element 400 is denoted as V(S). When switching element 400 is turned on, V(S)=0, while switching element 400 is turned off, V(S)>0. If V(S) becomes excessively greater due to the surge voltage or the like, the breakdown may occur.

Drive control circuit 300 drives gate (G) to a voltage Vh so as to turn on switching element 400 when control signal SG is at the H level, and drives gate (G) to a voltage V1 so as to turn off switching element 400 when control signal SG is at the L level. For example, voltage Vh is about 12 (V) to 15 (V), and voltage V1 is about the ground voltage (GND) to −15 (V).

Drive control circuit 300 includes drive switches 305 and 306, a gate resistance changeover switch 307, and resistance elements 308 and 309 for providing gate resistance. Drive switch 305 is disposed between a voltage source 301 for supplying voltage Vh and a node Na. Drive switch 306 is disposed between a voltage source 302 for supplying voltage V1 and node Na. Drive switch 305 is turned on when control signal SG is at the H level. Drive switch 306 is turned on when control signal SG is at the L level (i.e., signal /SG, which is the inversion signal of SG, is at the H level).

Resistance element 308 is connected between nodes Na and Ng. Gate resistance changeover switch 307 and resistance element 309 are connected to each other between nodes Na and Ng, in parallel with resistance element 308.

When gate resistance changeover switch 307 is turned off, only resistance element 308 is connected between nodes Na and Ng. On the other hand, when gate resistance changeover switch 307 is turned on, resistance elements 308 and 309 are connected in parallel between nodes Na and Ng. Thus, the gate resistance when gate resistance changeover switch 307 is turned on is lower than the gate resistance when gate resistance changeover switch 307 is turned off.

Nodes Ng and Ne of drive control circuit 300 are electrically connected to gate (G) and emitter (E) of switching element 400, respectively. Thus, a gate capacitance Cg is present between the gate and the emitter of switching element 400.

When control signal SG is at the H level, drive switch 305 is turned on and gate capacitance Cg is charged to voltage Vh. Thus, switching element 400 is turned on in response to the increase of gate voltage V(G). On the other hand, when control signal SG is at the L level, drive switch 305 is turned off and gate capacitance Cg is discharged to voltage V1. Thus, switching element 400 is turned off in response to the decrease of gate voltage V(G).

The turn-on or turn-off of switching element 400 is controlled by the voltage or current of the control electrode (in the case of IGBT, gate voltage). If the driving speed of the control electrode (gate) by drive control circuit 300 is high and the change rate of gate voltage V(G) is high, switching element 400 will be turned on or off in a short time. In other words, the switching speed increases. On the other hand, if the driving speed of the control electrode (gate) by drive control circuit 300 is low and the change rate of gate voltage V(G) is low, a certain period of time is needed to turn on or off switching element 400. In other words, the switching speed decreases.

Figure 25:
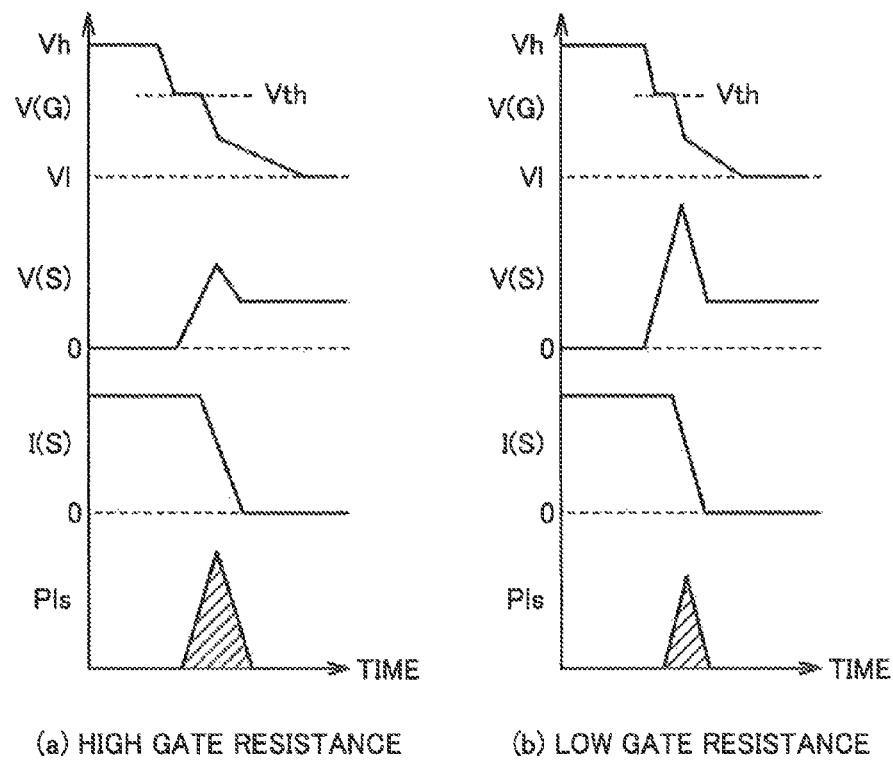
FIG. 25 includes waveform diagrams illustrating an operation relationship between a gate resistance and a switching speed of a switching element.

FIG. 25 is a waveform diagram illustrating an operation relationship between the gate resistance and the switching speed of a switching element during the turn-off. FIG. 25(a) illustrates the operation waveforms when gate resistance changeover switch 307 is turned off, namely the gate resistance is high. On the other hand, FIG. 25(b) illustrates the operation waveforms when gate resistance changeover switch 307 is turned on, namely the gate resistance is low.

With reference to FIGS. 25(a) and 25(b), during the turn-off, gate voltage V(G) is driven by drive control circuit 300 to change from the state where gate voltage V(G)=Vh toward voltage V1.

As gate voltage V(G) becomes lower than the predetermined threshold voltage Vth, switching element 400 starts to turn off. As a result, current I(S) decreases while terminal-terminal voltage V(S) starts to increase. In the complete turn-off state, gate voltage V(G)=V1 and current I(S)=0. Thereby, terminal-terminal voltage V(S) reaches a voltage level (final value) for blocking switching element 400. During the turn-off, terminal-terminal voltage V(S) will become higher than the final value due to the occurrence of the surge voltage. In order to avoid the element failure, it is necessary to reduce the surge voltage so as to suppress the instantaneous maximum value of V(S).

As illustrated in FIG. 25(a), when the gate resistance is high, the change rate of gate voltage V(S) during the turn-off decreases. As a result, the change in current I(S) also becomes gentle, and thereby, the surge voltage is suppressed. Meanwhile, since it takes some time before current I(S)=0 to reach the complete turn-off, the switching loss (integral value of PIs) increases.

In contrast, as illustrated in FIG. 25(b), when the gate resistance is low, the change rate of gate voltage V(S) during the turn-off increases. As a result, the change in current I(S) becomes steep, and thereby, the surge voltage increases. In other words, the maximum value of terminal-terminal voltage V(S) becomes greater than the case where the gate resistance is low. Meanwhile, since the time before current I(S)=0 to reach the complete turn-off is shortened, the switching loss (integral value of PIs) decreases.

As mentioned, when the gate resistance is high and the change rate of the gate voltage (i.e., switching speed) is low, the surge voltage is suppressed whereas the switching loss increases. In contrast, when the gate resistance is low and the change rate of the gate voltage (i.e., switching speed) is high, the surge voltage is increased whereas the switching loss decreases. Drive control circuit 300 can adjust the switching loss and the surge voltage through variably controlling the switching speed of switching element 400 in response to the on or off of gate resistance changeover switch 307.

Figure 26:
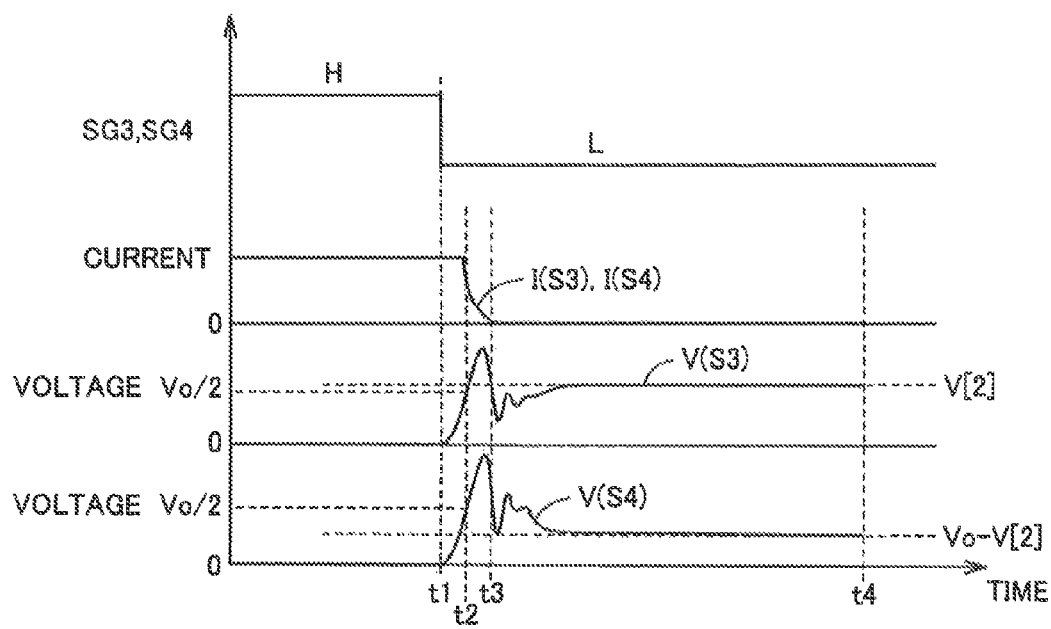
FIG. 26 is a waveform diagram illustrating operations of switching elements constituting the power converter according to the present embodiment when they are turned off in the single power source mode.

FIG. 26 is a waveform diagram illustrating operations of the switching elements constituting power converter 50 according to the present embodiment when they are turned off in the single power source mode. The wave forms of the pair of switching elements S3 and S4 when they are turned off in the single power source mode using only DC power source 10 are representatively illustrated in FIG. 26.

With reference to FIG. 26, control signals SG3 and SG4 are set to the H level until timing t1, and switching element S3 and S4 are turned on. Therefore, terminal-terminal voltage V(S3) of switching element S3 and terminal-terminal voltage V(S4) of switching element S4 switching element are zero. In this state, current path 150 in FIG. 7(a) is formed.

At timing t1, control signals SG3 and SG4 change from the H level to the L level, and thereby, switching elements S3 and S4 are instructed to be turned off concurrently. Thus, drive switch 306 (FIG. 24) is turned on, and the gate voltage decreases, and accordingly, switching elements S3 and S4 starts to turn off. In response thereto, voltage V(S3) and voltage V(S4) increase equally.

At timing t2, it becomes that $V(S3)=V(S4)=Vo/2$. Thus, diodes D3 and D4 are turned on, and thereby, current path 151 of FIG. 7(b) is formed in place of current path 150 of FIG. 7(a). Accordingly, as current I(S3) of switching element S3 and current I(S4) of switching element S4 decrease, the surge voltage is generated in switching elements S3 and S4. As a result, voltages V(S3) and V(S4) further increase. At timing t3, it becomes that $I(S3)=I(S4)=0$.

In the period from timing t3 to t4, since no potential is generated in reactor L2, voltage V(S4) of switching element S4 converges to Vo−V[2]. Thereby, voltage V(S3) of switching element S3 converges to $Vo-(Vo-V[2])=V[2]$.

Since output voltage Vo is blocked by the two switching elements S3 and S4 which are connected in series, the surge voltage generated in the period from timing t2 to t3 is superimposed on voltage Vo/2 at timing t2.

In contrast, in power converter 50# of the comparative example illustrated in FIG. 23, since output voltage Vo is blocked by a single switching element, the surge voltage at the turn-off is superimposed on output voltage Vo. Thus, in the single power source mode of power converter 50, the terminal-terminal voltage of the switching element at the turn-off where the surge voltage is generated is suppressed lower as compared with power converter 50# of the comparative example. In other words, in the single power source mode of power converter 50, as compared with power converter 50#, the capacity (voltage) of the surge voltage is increased to Vo/2.

Thus, in the single power source mode, it is expected to reduce the switching loss by increasing the switching speed. Accordingly, although the surge voltage at the turn-off will increase, since there still exists a margin of Vo/2, it is possible to prevent the terminal-terminal voltage from exceeding the breakdown voltage. As a result, it is possible to suppress the switching loss from increasing by turning two switching elements on or off concurrently.

In contrast, in the parallel connection mode, since switching elements S1 to S4 are controlled independently, it is necessary to block the sum of output voltage Vo and the surge voltage with a single switching element. Therefore, it is necessary to suppress the switching speed.

Therefore, in the single power source mode, the switching speed of each of switching elements S1 to S4 is reduced by drive control circuit 300 (FIG. 24) lower than that in the two power source mode (the parallel connection mode and the series connection mode). Specifically, in the single power source mode, the gate resistance decrease as gate resistance changeover switch 307 is turned on; on the other hand, in the two power source mode, the gate resistance increases as gate resistance changeover switch 307 is turned on.

Note that as illustrated in FIG. 20, since switching elements S2 and S4 are controlled on or off concurrently in the series connection mode, theoretically it is possible to reduce the switching speed for each of switching elements S2 and S4 as the single power source mode. However, since switching element S1 is controlled on or off independently in the series connection mode, it is difficult to reduce the switching speed of switching element S1 which serves as a single switching element to block the sum of output voltage Vo and the surge voltage. If the switching speed is made different between the switching elements, it is concerned that the adjustment of the dead time or the like will become difficult. Therefore, it is preferred that the switching speed of each of switching elements S1 to S4 in the series connection mode is set equivalent to that in the parallel connection mode instead of being reduced equivalent to that in the single power source mode.

Figure 27:
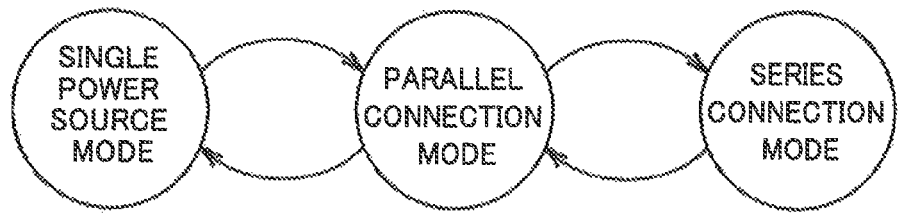
FIG. 27 is a diagram illustrating the transition of operation modes in the power converter according to the present embodiment.

FIG. 27 is a diagram illustrating the transition of the operation modes in power converter 50.

With reference to FIG. 27, the operation modes are changed among the single power source mode, the series connection mode and the parallel connection mode in accordance with the state of DC power sources 10 and 20 and/or load 30.

In the series connection mode, the DC voltage conversion is performed between voltage V[1]+V[2] and output voltage Vo. On the other hand, in the parallel connection mode and the single power source mode, the DC voltage conversion is performed between voltages V[1], V[2] and output voltage Vo. Thus, when the single power source mode is selected, in order to prevent the duty ratio from changing significantly, it is preferable not to shift the operation mode directly between the single power source mode and the series connection mode.

Figure 28:
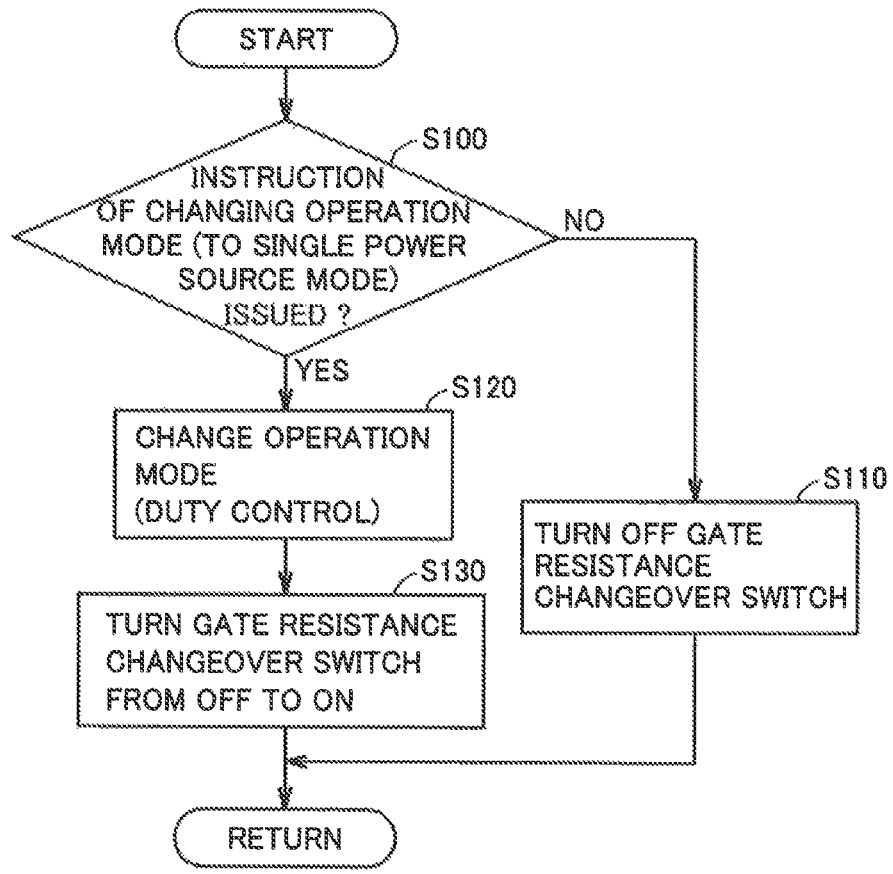
FIG. 28 is a flowchart illustrating a control process performed when the parallel connection mode is being changed to the single power source mode.
Figure 29:
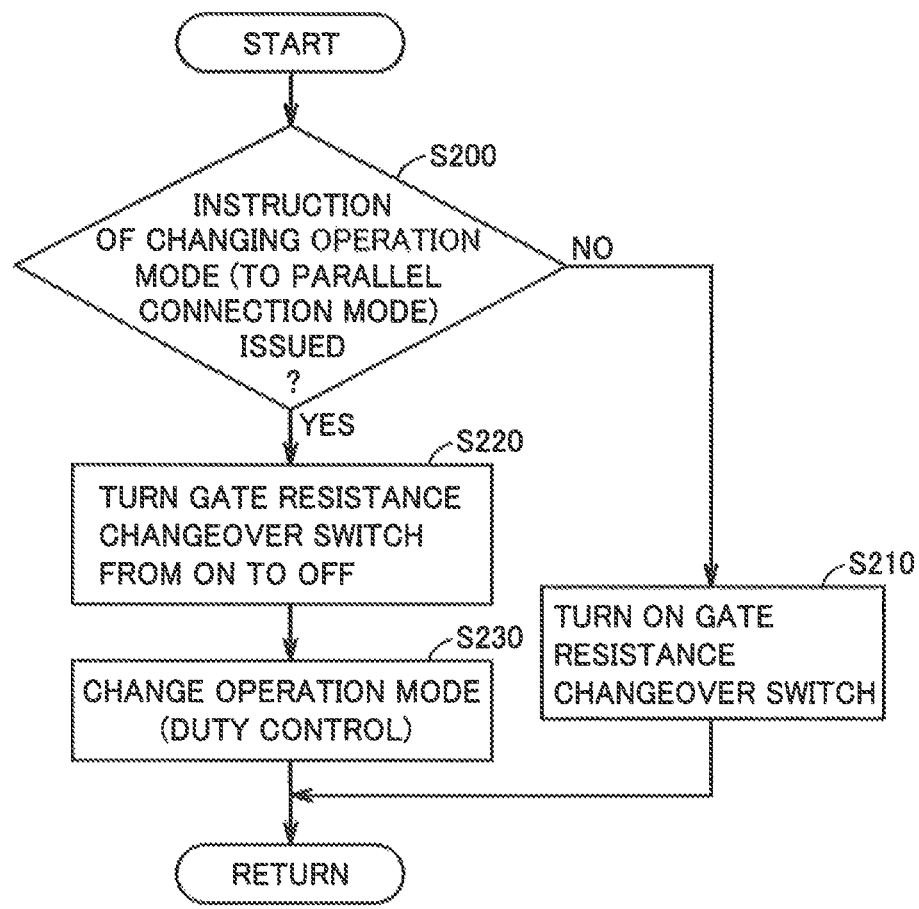
FIG. 29 is a flowchart illustrating a control process performed when the single power source mode is being changed to the parallel connection mode.

FIG. 28 and FIG. 29 each illustrates a control process relating to the control of the switching speed performed by the drive control circuit in changing the above operations modes.

FIG. 28 illustrates a control process performed in a period where the parallel connection mode is being selected. The control process illustrated in FIG. 28 is executed at a predetermined interval each time in selecting the parallel connection mode.

With reference to FIG. 28, at step S100, control device 40 determines whether or not the changing to the single power source mode from the parallel connection mode is instructed. In the case where the changing of the operation mode is not instructed and the parallel connection mode is maintained (NO at S100), the process proceeds to step S110 where control device 40 turns off the gate resistance changeover switch 307. Accordingly, the gate resistance is set high, and thereby, in the parallel connection mode where each switching element is controlled on or off independently, the driving speed, namely the switching speed of the control electrode (gate) of the switching element can be suppressed low.

On the other hand, in the case where the changing to the single power source mode is instructed (YES at S100), the process proceeds to step S120 where control device 40 executes the changing of the operation mode. Specifically, the arithmetic processing for the on or off control (duty control) of the switching elements S1 to S4 is changed to the single power source mode.

After changing the duty control of the switching elements at step S120, control device 40 switches gate resistance changeover switch 307 in drive control circuit 300 from off to on at step S130. Accordingly, the gate resistance of each of the switching elements S1 to S4 is reduced, and thereby the switching speed increases. Therefore, it is possible to suppress the switching loss of switching elements S1 to S4 in the single power source mode where two of the switching elements are controlled on or off concurrently.

When the on or off control is performed in the parallel connection mode, increasing the switching speed may cause the surge voltage to increase, and thereby cause the terminal-terminal voltage to become excessively large. Thus, after the on or off control (duty control) of the switching elements is changed to the single power source mode, the switching speed is increased by drive control circuit 300. Accordingly, it is possible to more reliably avoid the element failure caused by the occurrence of the excessively large voltage.

FIG. 29 illustrates a control process performed in a period where the single power source mode is being selected. The control process illustrated in FIG. 29 is executed at a predetermined interval each time in selecting the parallel connection mode.

With reference to FIG. 29, at step S200, control device 40 determines whether or not the changing to the parallel connection mode from the single power source mode is instructed. In the case where the changing of the operation mode is not instructed and the single power source mode is maintained (NO at S200), the process proceeds to step S210 where control device 40 turns off the gate resistance changeover switch 307. Accordingly, the gate resistance is set low, and thereby, in the single power source mode where multiple switching elements are controlled on or off concurrently, the switching speed can be increased so as to suppress the switching loss.

On the other hand, in the case where the changing to the parallel connection mode is instructed (YES at S200), the process proceeds to step S220 where control device 40 switches the gate resistance changeover switch 307 in drive control circuit 300 from on to off prior to the changing of the operation mode. Accordingly, the gate resistance of each of switching elements S1 to S4 is increased, and thereby the switching speed decreases. Thereafter, at step S230, the control device 40 changes the arithmetic processing for the on or off control (duty control) of the switching elements to the parallel connection mode after the switching speed is decreased.

Thereby, it is possible to prevent switching elements S1 to S4 from being controlled on or off independently in the parallel connection mode when the switching speed is high. Accordingly, it is possible to more reliably avoid the element failure caused by the occurrence of the excessively large voltage.

As mentioned above, according to power converter 50 of the present embodiment, in the operation mode where a plurality of switching elements are controlled on or off concurrently (the single power source mode), increasing the capacity for the surge voltage makes it possible to increase the switching speed so as to suppress the switching loss. On the other hand, in the operation mode where each switching element is controlled on or off independently (particularly the parallel connection mode), it is possible to suppress the switching speed so as to prevent the occurrence of the excessively large voltage caused by the surge voltage.

Thereby, in the power converter which is configured to include a plurality of switching elements, it is possible to control the switching speed in accordance with the operation mode so as to suppress the surge voltage and reduce the switching loss.

In the present embodiment, a chopper circuit is illustrated as the configuration of the power converter, the application of the present invention is not limited to a chopper circuit. In other words, the circuit configuration is arbitrary as long as the power converter is formed from a plurality of switching elements in any number and has an operation mode in which the plurality of switching elements are controlled on or off concurrently.

Further, the drive control circuit for controlling the switching speed is not limited to the circuit configuration illustrated in FIG. 24, any circuit for changing the switching speed is applicable.

Furthermore, it should be noted that load 30 can be formed by any device as long as it operates on DC voltage Vo. In other words, although in the present embodiment, load 30 has been described to include a driving motor for driving an electrically powered vehicle, it is not limited thereto in the present invention.

It should be understood that the embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

INDUSTRIAL APPLICABILITY

The present invention is applicable to the control of a power converter configured to include a plurality of semiconductor power switching elements.

REFERENCE SIGNS LIST

5: power supply system; 6, 7: chopper circuit; 10, 20: DC power source; 15: line; 25: carrier signal; 30: load; 32: inverter; 35: motor generator; 36: power transmission gear; 37: drive wheel; 40: control device; 50: power converter; 101, 102: operating point; 110, 120: operating region; 150, 151, 160, 161, 170, 171, 172, 173, 174: current path; 201, 202, 203: control block; 300: drive control circuit; 301, 302: voltage source; 305, 306: drive switch; 307: gate resistance changeover switch; 308, 309: resistance element (gate resistance); 400, S1-S4: power semiconductor switching element; Cg: gate capacitance; D1-D4: anti-parallel diode; Da, Db, Dc: duty ratio; Di, Dv: duty ratio command value; DiFF, DvFF: feedforward control amount; G: gate; SG, SG1-SG4 control signal; GL: ground line; Hi, Hv: transfer function; I[1], I[2]: current; Ii*: current command value; Vo*: voltage command value; L1, L2: reactor; N1, N2, N3, Na, Ng: node; PL: power line; PS1, PS2: power source; Pls: switching loss; Rg1, Rg2: resistance value; SDa(/SDa), SDb(/SDb), SDc(/SDc): control pulse signal; V(G): gate voltage; V[1], V[2]: voltage (DC power source); Vh, Vl: voltage (on or off); V(S), V(S3), V(S4): terminal-terminal voltage; Vo: output voltage; Vth: threshold voltage

The invention claimed is:
1. A control device for a power converter equipped with a plurality of switching elements, comprising:
 a drive control circuit disposed in correspondence with each of said plurality of switching elements for con- trolling a driving speed of a control electrode of a corresponding switching element; and a control circuit configured to select a first mode in which at least one of the plurality of switching elements is controlled off independently from other switching elements and a second mode in which each of said plurality of switching elements is paired with another switching element and controlled off concurrently with the paired switching element, said drive control circuit setting said driving speed higher in said second mode than in said first mode, wherein said power converter is configured to perform a DC voltage conversion between a power line electrically connected to a load and a first DC power source and a second DC power source so as to control an output voltage on said power line, said plurality of switching elements includes a first switching element which is electrically connected between said power line and a first node, a second switching element which is electrically connected between said first node and a second node, a third switching element which is electrically connected between said second node and a third node electrically connected to a negative terminal of said second DC power source, and a fourth switching element which is electrically connected between said third node and a negative terminal of said first DC power source, said power converter further includes a first reactor which is electrically connected between said second node and a positive terminal of said first DC power source, and a second reactor which is electrically connected between said first node and a positive terminal of said second DC power source.

2. The control device for the power converter according to claim 1, wherein in said first mode, at least one of said first to fourth switching elements is controlled in accordance with a pulse signal only applied to the at least one of said first to fourth switching elements, and in said second mode, each of said first to fourth switching elements is controlled in accordance with a common pulse signal applied to the paired switching element.

3. The control device for the power converter according to claim 1, wherein each of said first to fourth switching elements is controlled, in said first mode, in accordance with a respective different pulse signal to control said output voltage with said DC voltage conversion in which said first and second DC power source are in parallel with each other to said power line.

4. The control device for the power converter according to claim 1, wherein said power converter is controlled so that a pair of said first and second switching elements and a pair of said third and fourth switching elements are alternately driven in said second mode, in accordance with a pulse signal for controlling said output voltage by said DC voltage conversion between said first DC power source and said power line.

5. The control device for the power converter according to claim 1, wherein said power converter is controlled so that a pair of said first and fourth switching elements and a pair of said second and third switching elements are alternately driven in said second mode, in accordance with a pulse signal for controlling said output voltage by said DC voltage conversion between said second DC power source and said power line.

6. The control device for the power converter according to claim 1, wherein said control device, when changing said first mode to said second mode, increases said driving speed in said drive control circuit after changing the control of said plurality of switching elements.

7. The control device for the power converter according to claim 1, wherein said control device, when changing said second mode to said first mode, changes the control of said plurality of switching elements after decreasing said driving speed in said drive control circuit.

8. A control method for a power converter equipped with a plurality of switching elements, said power converter being provided with a first mode in which at least one of the plurality of switching elements is controlled off independently from other switching elements and a second mode in which each of said plurality of switching elements is paired with another switching element and controlled off concurrently with the paired switching element, said power converter being configured to perform a DC voltage conversion between a power line electrically connected to a load and a first DC power source and a second DC power source so as to control an output voltage on said power line, said plurality of switching elements including a first switching element which is electrically connected between said power line and a first node, a second switching element which is electrically connected between said first node and a second node, a third switching element which is electrically connected between said second node and a third node electrically connected to a negative terminal of said second DC power source, and a fourth switching element which is electrically connected between said third node and a negative terminal of said first DC power source, said power converter further including a first reactor which is electrically connected between said second node and a positive terminal of said first DC power source, and a second reactor which is electrically connected between said first node and a positive terminal of said second DC power source, said control method comprising the steps of:

controlling a driving speed of a control electrode of the switching element at a first speed through a drive control circuit disposed in correspondence with each of said plurality of switching elements as said power converter is operating at said first mode; and controlling said driving speed at a second speed which is higher than said first speed through said drive control circuit as said power converter is operating at said second mode.

9. The control method for the power converter according to claim 8, further comprising the steps of:

issuing an instruction of changing said first mode to said second mode;

changing the control of said plurality of switching elements as the instruction of changing said first mode to said second mode is issued; and increasing said driving speed from said first speed to said second speed through said drive control circuit after changing the control of said plurality of switching elements.

10. The control method for the power converter according to claim 8, further comprising the steps of:

issuing an instruction of changing said second mode to said first mode;

decreasing said driving speed from said second speed to said first speed through said drive control circuit as the instruction of changing said second mode to said first mode is issued; and changing the control of said plurality of switching elements after decreasing said driving speed.

* * * * *